(12) United States Patent
Komiya et al.

(10) Patent No.: US 12,358,089 B2
(45) Date of Patent: Jul. 15, 2025

(54) WORKPIECE HOLDING APPARATUS

(71) Applicant: THK CO., LTD., Tokyo (JP)

(72) Inventors: Yoshikazu Komiya, Tokyo (JP);
Yukihiro Takeya, Tokyo (JP)

(73) Assignee: THK CO., LTD., Tokyo (JP)

( * ) Notice: Subject to any disclaimer, the term of this patent is extended or adjusted under 35 U.S.C. 154(b) by 245 days.

(21) Appl. No.: 17/926,050

(22) PCT Filed: May 11, 2021

(86) PCT No.: PCT/JP2021/017820
§ 371 (c)(1),
(2) Date: Nov. 17, 2022

(87) PCT Pub. No.: WO2021/235264
PCT Pub. Date: Nov. 25, 2021

(65) Prior Publication Data
US 2023/0182249 A1 Jun. 15, 2023

(30) Foreign Application Priority Data

May 22, 2020 (JP) .................................. 2020-089319
Sep. 8, 2020 (JP) .................................. 2020-150244

(51) Int. Cl.
*B23Q 3/00* (2006.01)
*B23Q 3/06* (2006.01)
*B23Q 3/08* (2006.01)

(52) U.S. Cl.
CPC .............. *B23Q 3/062* (2013.01); *B23Q 3/088* (2013.01); *B23Q 2703/04* (2013.01)

(58) Field of Classification Search
CPC ........................... B23Q 3/088; B23Q 2703/04
See application file for complete search history.

(56) References Cited

U.S. PATENT DOCUMENTS

| 5,403,057 A * | 4/1995 | Sugito .................. B25B 1/2421 294/902 |
| 5,988,342 A | 11/1999 | Ito et al. |
| 6,463,835 B1 | 10/2002 | Segawa et al. |
| 9,033,328 B2 * | 5/2015 | Baumann ................ B25B 5/061 269/266 |

(Continued)

FOREIGN PATENT DOCUMENTS

| CN | 203109668 U | 8/2013 |
| CN | 104308589 A | 1/2015 |

(Continued)

OTHER PUBLICATIONS

International Search Report dated Aug. 10, 2021, issued in counterpart International Application No. PCT/JP2021/017820. (5 pages).

(Continued)

*Primary Examiner* — Lee D Wilson
(74) *Attorney, Agent, or Firm* — WHDA, LLP

(57) ABSTRACT

A workpiece holding apparatus includes: a main body; at least one shaft member capable of coming into contact with a workpiece; a clamping device into which the shaft member is inserted, the clamping device being attached to the main body and capable of switching between an unclamping state that releases the shaft member and a clamping state that clamps the shaft member; and a trigger member configured to switch the clamping device between the unclamping state and the clamping state. The trigger member comes into direct contact with the workpiece, or comes into indirect contact with the workpiece via at least a part of the shaft member, thus moving relative to the main body, and the clamping device switches from the unclamping state to the clamping state.

20 Claims, 17 Drawing Sheets

(56) References Cited

U.S. PATENT DOCUMENTS

| | | | |
|---|---|---|---|
| 2005/0029727 A1* | 2/2005 | Siegel | B25B 1/08 |
| | | | 269/266 |
| 2005/0082731 A1 | 4/2005 | Moore et al. | |
| 2005/0269757 A1 | 12/2005 | Stevenson et al. | |
| 2009/0065994 A1 | 3/2009 | Stevenson et al. | |
| 2011/0291342 A1* | 12/2011 | Gindy | B25B 1/2421 |
| | | | 269/266 |
| 2015/0013145 A1 | 1/2015 | Fujiwara et al. | |
| 2016/0221157 A1 | 8/2016 | Brucker | |
| 2023/0182249 A1* | 6/2023 | Komiya | B25J 15/0226 |
| | | | 269/21 |

FOREIGN PATENT DOCUMENTS

| | | | |
|---|---|---|---|
| CN | 106141527 | A | 11/2016 |
| CN | 106378653 | A | 2/2017 |
| CN | 106826318 | A | 6/2017 |
| CN | 104275613 | B | 12/2017 |
| CN | 107900733 | A | 4/2018 |
| JP | 57-126940 | U | 8/1982 |
| JP | 57-181536 | U | 11/1982 |
| JP | H09150337 | A | 6/1997 |
| JP | 11-4508 | A | 1/1999 |
| JP | 2016-153161 | A | 8/2016 |

OTHER PUBLICATIONS

Office Action dated Oct. 25, 2024, issued in counterpart TW Application No. 110117826. (6 pages).

Office Action dated Apr. 10, 2025, issued in counterpart CN Application No. 202180036309.4, with English translation. (11 pages).

* cited by examiner

WORKPIECE HOLDING APPARATUS

TECHNICAL FIELD

The present invention relates to a workpiece holding apparatus that holds a workpiece, and more particularly to a workpiece holding apparatus that uses a clamping device.

BACKGROUND ART

A clamping device is known which switches between an unclamping state that releases a shaft member and a clamping state that clamps the shaft member (refer to Patent Literature 1). The clamping device includes an outer cylinder into which the shaft member is inserted, a rolling element placed in a wedge-shaped space between the outer cylinder and the shaft, and a retainer that holds the rolling element. When the outer cylinder is moved in one direction relative to the retainer to cause the rolling element to roll to a small diameter side of the wedge-shaped space, the shaft member can be clamped. On the other hand, when the outer cylinder is moved relative to the retainer in a direction opposite to the one direction to cause the rolling element to move to a large diameter side of the wedge-shaped space, the shaft member can be released.

A workpiece holding apparatus that, for example, holds, suctions, and supports a workpiece can be built by using the clamping device. For example, a pair of shaft members is placed to the left and right of a workpiece, and the pair of shaft members secured by the clamping devices sandwiches the workpiece, and thus the workpiece can be held. Moreover, if a suction pad is provided at a distal end of each of the shaft members secured by the clamping devices, the workpiece can be suctioned.

CITATION LIST

Patent Literature

Patent Literature 1: JP H11-4508 A

SUMMARY OF INVENTION

Technical Problem

However, the known clamping device requires an air cylinder to switch the clamping device from the unclamping state to the clamping state. Hence, there is a problem that the clamping device cannot be operated in uses and environments where compressed air cannot be used.

Hence, a first problem of the present invention is to provide a workpiece holding apparatus that can operate a clamping device without the use of an air cylinder.

Moreover, if a plurality of shaft members can be placed in a densely packed manner, various workpieces can be, for example, held, suctioned, and supported.

Hence, a second problem of the present invention is to provide a workpiece holding apparatus where a plurality of shaft members can be placed in a densely packed manner.

Solution to Problem

In order to solve the above first problem, a first aspect of the present invention is a workpiece holding apparatus including: a main body; at least one shaft member capable of coming into contact with a workpiece; a clamping device into which the shaft member is inserted, the clamping device being attached to the main body and capable of switching between an unclamping state that releases the shaft member and a clamping state that clamps the shaft member; and a trigger member configured to switch the clamping device between the unclamping state and the clamping state, in which the trigger member comes into direct contact with the workpiece, or comes into indirect contact with the workpiece via at least a part of the shaft member, thus moving relative to the main body, and the clamping device switches from the unclamping state to the clamping state.

In order to solve the above second problem, a second aspect of the present invention is a workpiece holding apparatus including: a main body; a plurality of shaft members capable of coming into contact with a workpiece; and a plurality of clamping devices into which the plurality of shaft members is inserted, the plurality of clamping devices being attached to the main body and capable of switching between an unclamping state that releases the shaft members and a clamping state that clamps the shaft members, in which as viewed in an axial direction of the main body, the plurality of shaft members includes first shaft members placed at the vertices of a first regular n-gon, and second shaft members placed at the vertices of a second regular n-gon having longer sides than the first regular n-gon, the second regular n-gon being substantially displaced $180°/n$ from the first regular n-gon, where n is any of integers equal to or greater than four.

Advantageous Effects of Invention

According to the first aspect of the present invention, it is possible to switch the clamping device from the unclamping state to the clamping state without the use of an air cylinder.

According to the second aspect of the present invention, it is possible to form a triangle with two adjacent inner first shaft members and one outer second shaft member, and to place the plurality of shaft members in a densely packed manner.

DESCRIPTION OF EMBODIMENTS

A workpiece holding apparatus of embodiments of the present invention is described in detail hereinafter on the basis of the accompanying drawings. However, the present invention can be embodied in various modes, and is not limited to the embodiments described in the description. The embodiments are provided with the intention of enabling those skilled in the art to understand the invention by fully disclosing the description.

(Clamping Device)

Figure 1:
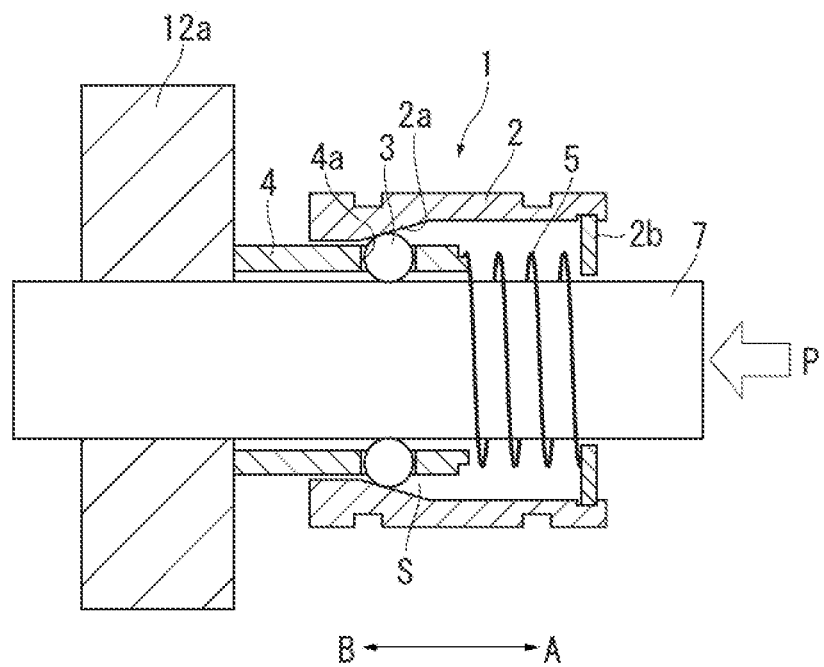
FIG. 1 is a cross-sectional view of a clamping device incorporated into a workpiece holding apparatus of the embodiments.

FIG. 1 is a cross-sectional view of a clamping device 1 incorporated into the workpiece holding apparatus of the embodiments. Firstly, the configuration of the clamping device 1 is described. The clamping device 1 is configured in such a manner as to switch between an unclamping state that releases a shaft member 7 and a clamping state that clamps the shaft member 7. The clamping device 1 includes an outer cylinder 2, rolling elements 3, a retainer 4, and a spring 5. The clamping device 1 is attached to a stationary plate 12a of a main body 12 (refer to FIG. 3).

The outer cylinder 2 is cylindrical. The shaft member 7 is inserted into the outer cylinder 2. A taper surface 2a that gradually reduces in the inner diameter in a direction B in FIG. 1 is formed on the inner surface of the outer cylinder 2. A wedge-shaped space S is formed between the outer surface of the shaft member 7 and the taper surface 2a of the outer cylinder 2. The rolling elements 3 are housed in the wedge-shaped space S. The normal plane of the outer cylinder 2 may be circular or polygonal. The normal plane of the shaft member 7 may also be circular or polygonal.

The rolling elements 3 are rollers or balls. The rollers may have a barrel shape or a drum shape. A plurality of the rolling elements 3 is placed in the circumferential direction in the wedge-shaped space S.

The retainer 4 holds the rolling elements 3. The retainer 4 is cylindrical. Opening portions 4a where the rolling elements 3 are housed respectively are formed in the retainer 4. The rolling elements 3 are housed in the opening portions 4a in a rollable manner. One end of the retainer 4 protrudes from the outer cylinder 2 in the axial direction. The one end of the retainer 4 is secured to the stationary plate 12a.

The spring 5 is housed in the outer cylinder 2. The spring 5 is placed between a retaining ring 2b that is attached to the outer cylinder 2 and the retainer 4. The spring 5 biases the rolling elements 3 held by the retainer 4 toward the small diameter side of the wedge-shaped space S.

As illustrated in FIG. 1, when the outer cylinder is moved in a direction A (one direction) relative to the retainer 4, the rolling elements 3 roll to the small diameter side of the wedge-shaped space S. The shaft member 7 is squeezed by the rolling elements 3 and clamped by the rolling elements 3 (the clamping device 1 enters the clamping state). At this point in time, a load P that acts on the shaft member 7 is transferred to the stationary plate 12a via the rolling elements 3 and the retainer 4. On the other hand, when the outer cylinder is moved in the direction B (the opposite direction) relative to the retainer 4, the rolling elements 3 move to the large diameter side of the wedge-shaped space S. The shaft member 7 is released from the rolling elements 3, and becomes movable in the axial direction (the clamping device 1 enters the unclamping state).

Figure 2:
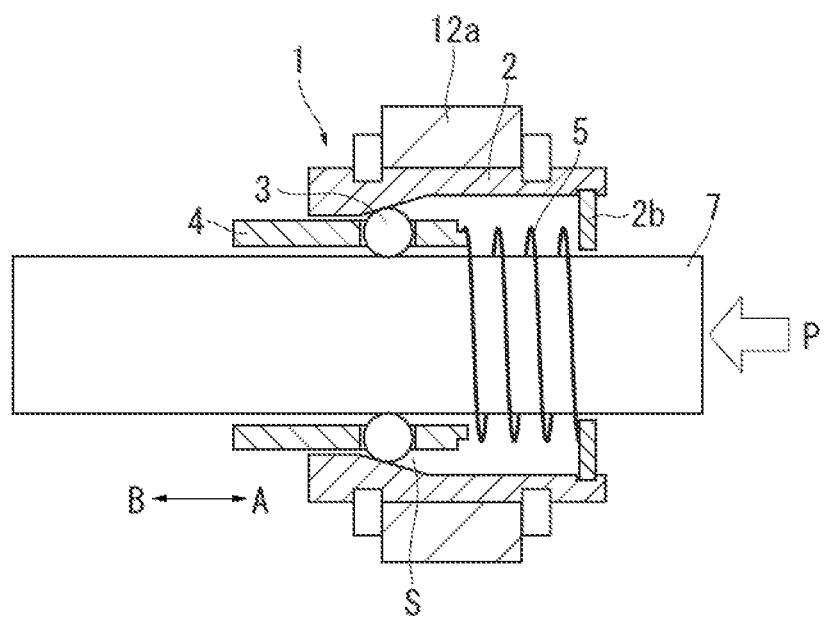
FIG. 2 is a diagram illustrating another example of the clamping device.

As illustrated in FIG. 2, the outer cylinder 2 of the clamping device 1 may be secured to the stationary plate 12a. When the retainer 4 is moved in the direction B relative to the outer cylinder 2, the rolling elements 3 roll to the small diameter side of the wedge-shaped space S, and the clamping device 1 enters the clamping state. The load P that acts on the shaft member 7 is transferred to the stationary plate 12a via the rolling elements 3 and the outer cylinder 2. On the other hand, when the retainer 4 is moved in the direction A relative to the outer cylinder 2, the rolling elements 3 move to the large diameter side of the wedge-shaped space S, and the clamping device 1 enters the unclamping state.

First Embodiment

Figure 3A:
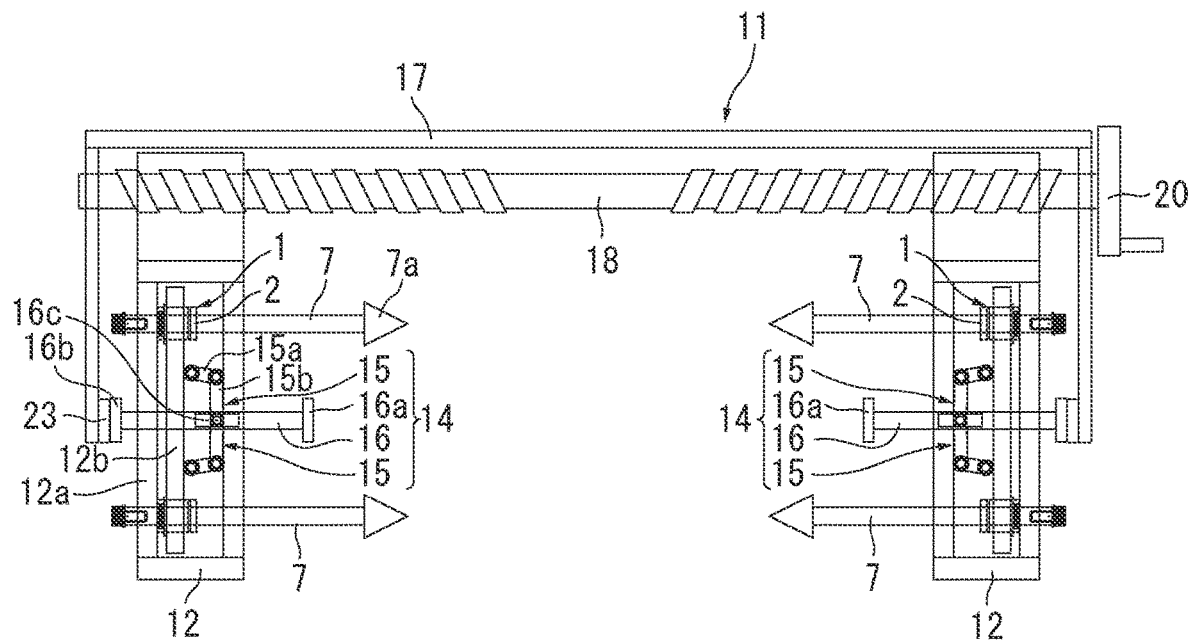
FIGS. 3(a) and 3(b) are plan views of a workpiece holding apparatus of a first embodiment of the present invention (FIG. 3(a) illustrates a state before holding a workpiece, and FIG. 3(b) illustrates a state after holding the workpiece).
Figure 3B:
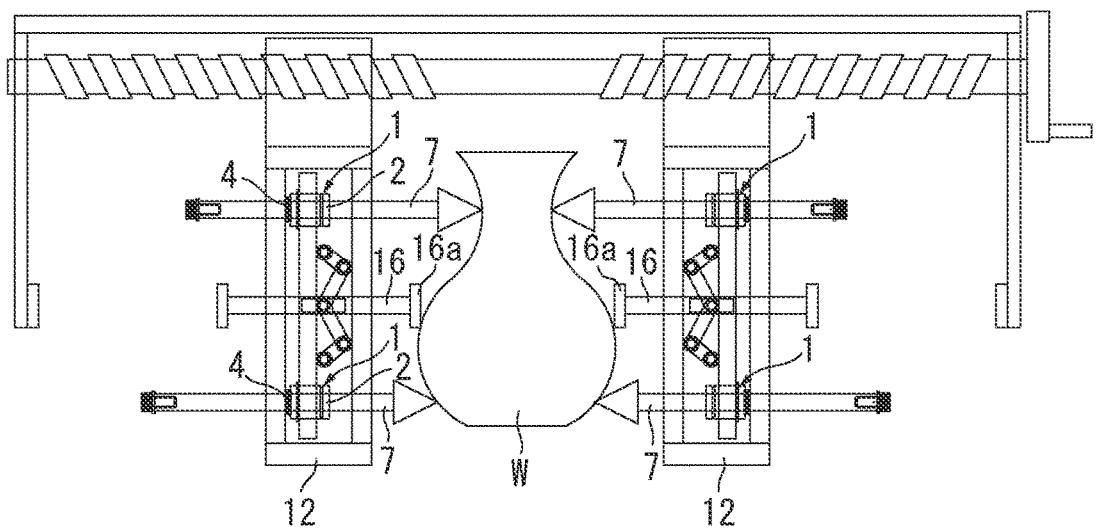

FIG. 3 illustrates a workpiece holding apparatus 11 of a first embodiment of the present invention. FIG. 3(a) illustrates a state before holding a workpiece W, and FIG. 3(b) illustrates a state after holding the workpiece W. FIG. 3 illustrates an example in which the workpiece holding apparatus 11 is used as a vise that holds and secures the workpiece W. However, the workpiece holding apparatus 11 may be incorporated into a robot to carry the workpiece W.

A reference sign 12 denotes a pair of left and right main bodies, a reference sign 7 denotes shaft members, a reference sign 1 denotes clamping devices, and a reference sign 14 denotes trigger mechanisms. The main bodies 12, the shaft members 7, the clamping devices 1, and the trigger mechanisms 14 are left-right symmetrical. The configurations of the left-main body 12, shaft member 7, clamping device 1, and trigger mechanism 14 are described below.

A plurality of the shaft members 7, a plurality of the clamping devices 1, and one trigger mechanism 14 are placed in the main body 12. The numbers of the shaft members 7 and the clamping devices 1 are not particularly limited. For example, four or more shaft members 7 may be placed in a matrix in the main body 12.

The main body 12 is movably supported by a base 17. The main body 12 moves to and from the workpiece W by use of a feed mechanism. The type of feed mechanism is not particularly limited. For example, a feed screw or an air cylinder can be used as the feed mechanism. FIGS. 3(a) and 3(b) illustrate a feed screw. A right-handed thread and a left-handed thread are formed on a screw shaft 18. The main body 12 is provided with a ball screw nut (not illustrated) that is threadedly engaged with the right-handed or left-handed thread of the screw shaft. The screw shaft 18 is rotated by, for example, a handle 20 or a motor to move the main body 12 to and from the workpiece W on the basis of the action of the ball screw.

The main body 12 includes a stationary plate 12a and a movable plate 12b. Retainers 4 (refer to FIGS. 3(b), 4(a), and 4(b)) of the clamping devices 1 are attached to the stationary plate 12a. Outer cylinders 2 of the clamping devices 1 are attached to the movable plate 12b. Levers 15 of the trigger mechanism 14 are caused by springs 5 (refer to FIG. 1) of the clamping devices 1 to bias the movable plate 12b. The outer cylinders 2 may be attached to the stationary plate 12a, and the retainers 4 to the movable plate 12b. Moreover, a spring (not illustrated) that causes the levers 15 to bias the movable plate 12b may be provided between the stationary plate 12a and the movable plate 12b.

The shaft members 7 are supported by the main body 12 in such a manner as to be movable in the axial direction. The stationary plate 12a is provided with linear motion bearings (not illustrated) such as ball bushings that guide the axial movement of the shaft members 7. A distal end of each of the shaft members 7 is provided with a contactor 7a that can come into contact with the workpiece W. The type of contactor 7a is not particularly limited. Examples of the contactors 7a include a pointed bullet-shaped or conical rubber or suction pad. Springs 19 (refer to FIG. 4(a)) that each extrude a respective shaft member 7 from the main body 12 are provided between a respective contactor 7a and the main body 12.

As illustrated in FIG. 3(a), the trigger mechanism 14 includes a shaft-shaped trigger member 16, and the levers 15. The trigger member 16 and the levers 15 are provided to switch the clamping devices 1 between the unclamping state and the clamping state. The trigger member 16 is supported by the main body 12 in such a manner as to be movable in the axial direction. The stationary plate 12a is provided with a linear motion bearing (not illustrated) such as a ball bushing that guides the axial movement of the trigger member 16. A distal end 16a of the trigger member 16 is in the form of a flange, and can come into contact with the workpiece W. The position of the distal end 16a of the trigger member 16 is determined according to the shape of the workpiece W. A rear end 16b of the trigger member 16 is in the form of a flange, and can come into contact with a return member 23. The return member 23 is attached to the base 17.

The levers 15 are coupled to the trigger member 16 in such a manner as to be tiltable on a pivot 16c. The levers 15 change the space between the stationary plate 12a and the movable plate 12b with the movement of the trigger member 16 relative to the main body 12. Each of the levers 15 has, for example, an L shape, and includes a short side portion 15a and a long side portion 15b (refer to FIG. 4(a)). An end of each of the long side portions 15b is coupled to the trigger member 16 in such a manner as to be tiltable. The short side portions 15a are placed between a stationary plate 12a1 and the movable plate 12b. Each of the short side portions 15a is provided with bearings 27 (refer to FIG. 4(a)) that come into contact with the movable plate 12b and the stationary plate 12a1. The configuration of the levers 15 is not limited to the above configuration.

As illustrated in FIG. 3(a), the main body 12 moves to an initial position. When the rear end 16b of the trigger member 16 comes into contact with the return member 23, the clamping devices 1 switch from the clamping state to the unclamping state. As illustrated in FIG. 3(b), when the main body 12 moves toward the workpiece W, the shaft members 7 follow the shape of the workpiece W since the clamping devices 1 are in the unclamping state. Preferably, the positions of the shaft members 7 of the clamping devices 1 are adjusted in such a manner as to cause the shaft members 7 to contact the workpiece W prior to the trigger member 16.

As illustrated in FIG. 3(b), when the main body 12 moves further toward the workpiece W and the distal end 16a of the trigger member 16 comes into direct contact with the workpiece W, the trigger member 16 moves relative to the main body 12, and the clamping devices 1 switch from the unclamping state to the clamping state. Hence, the shaft members 7 are secured and can hold the workpiece W. When holding the workpiece W, the shaft members 7 follow the shape of the workpiece W, thus being able to hold a wide variety of workpieces W.

Figure 4A:
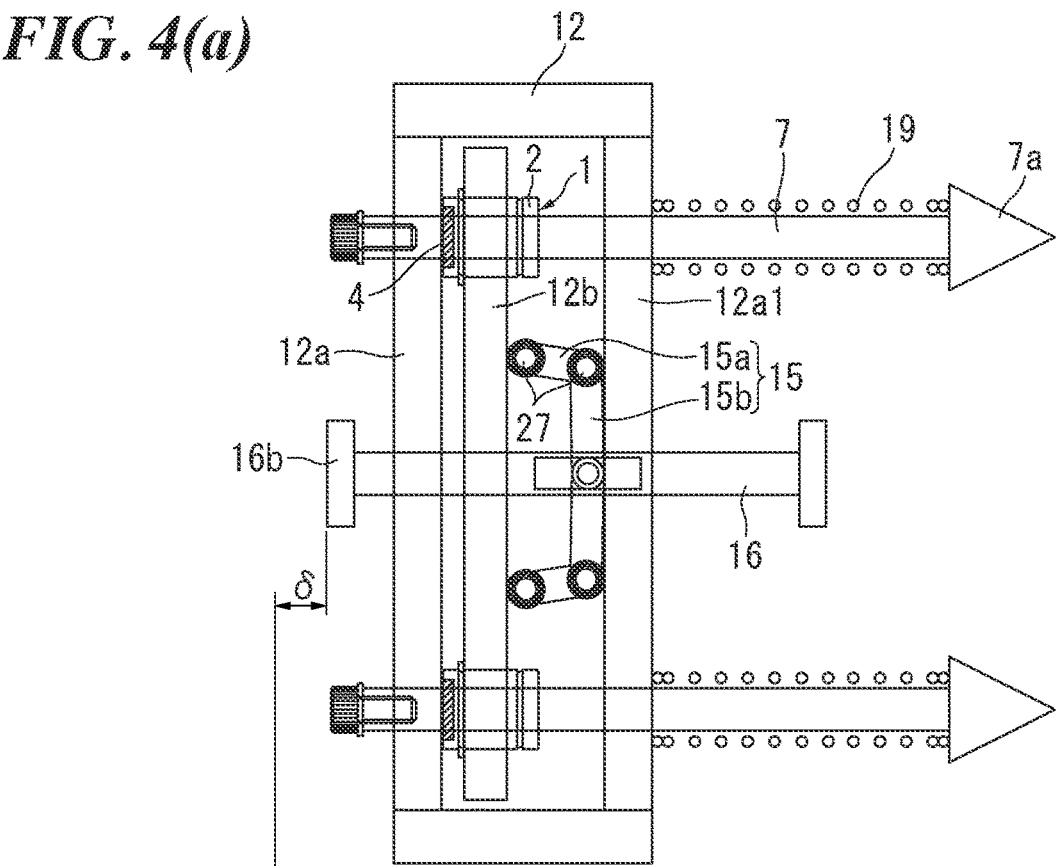
FIGS. 4(a) and 4(b) are enlarged views of a main body of the workpiece holding apparatus of the first embodiment of the present invention (FIG. 4(a) illustrates an unclamping state of the clamping devices, and FIG. 4(b) illustrates a clamping state).
Figure 4B:
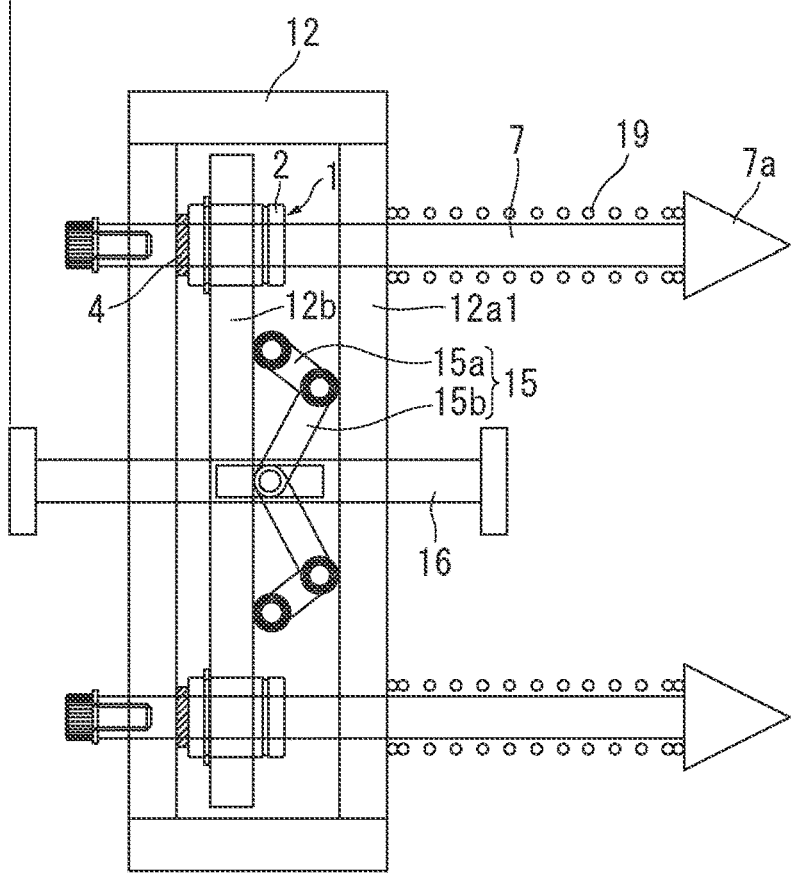

FIGS. 4(a) and 4(b) illustrate enlarged views of the main body 12, the shaft members 7, and the trigger mechanism 14. FIG. 4(a) illustrates the unclamping state, and FIG. 4(b) illustrates the clamping state. When the rear end 16b of the trigger member 16 comes into contact with the return member 23 as illustrated in FIG. 3(a), the trigger member 16 moves δ to the right in FIG. 4(a) relative to the main body 12 as illustrated in FIG. 4(a). Hence, the short side portions 15a of the levers 15 rotate in such a manner as to stand up between the stationary plate 12a1 and the movable plate 12b, and then the outer cylinders 2 move to the left in FIG. 4(a) relative to the retainers 4. As a result, the clamping devices 1 switch from the clamping state to the unclamping state.

On the other hand, when the distal end 16a of the trigger member 16 comes into contact with the workpiece W as illustrated in FIG. 3(b), the trigger member 16 moves δ to the left in FIG. 4(b) relative to the main body 12 as illustrated in FIG. 4(b). Hence, the short side portions 15a of the levers 15 rotate in such a manner as to incline between the stationary plate 12a1 and the movable plate 12b, and then the outer cylinders 2 move to the right in FIG. 4(b) relative to the retainers 4. As a result, the clamping devices 1 switch from the unclamping state to the clamping state.

Up to this point, the configuration and operation of the workpiece holding apparatus 11 of the embodiment have been described. The workpiece holding apparatus 11 of the embodiment has the following effects:

The trigger member 16 comes into direct contact with the workpiece W, thus moving relative to the main body 12. As a result, the clamping devices 1 switch from the unclamping state to the clamping state. Hence, it is possible to switch the clamping devices 1 from the unclamping state to the clamping state without the use of an air cylinder.

The trigger member 16 comes into contact with the return member 23, thus moving relative to the main body 12. As a result, the clamping devices 1 switch from the clamping state to the unclamping state. Hence, it is possible to switch the clamping devices 1 from the clamping state to the unclamping state without the use of an air cylinder.

The pair of main bodies 12 is placed in such a manner as to sandwich the workpiece W. Therefore, it is possible to hold a wide variety of workpieces W.

Second Embodiment

Figure 5:
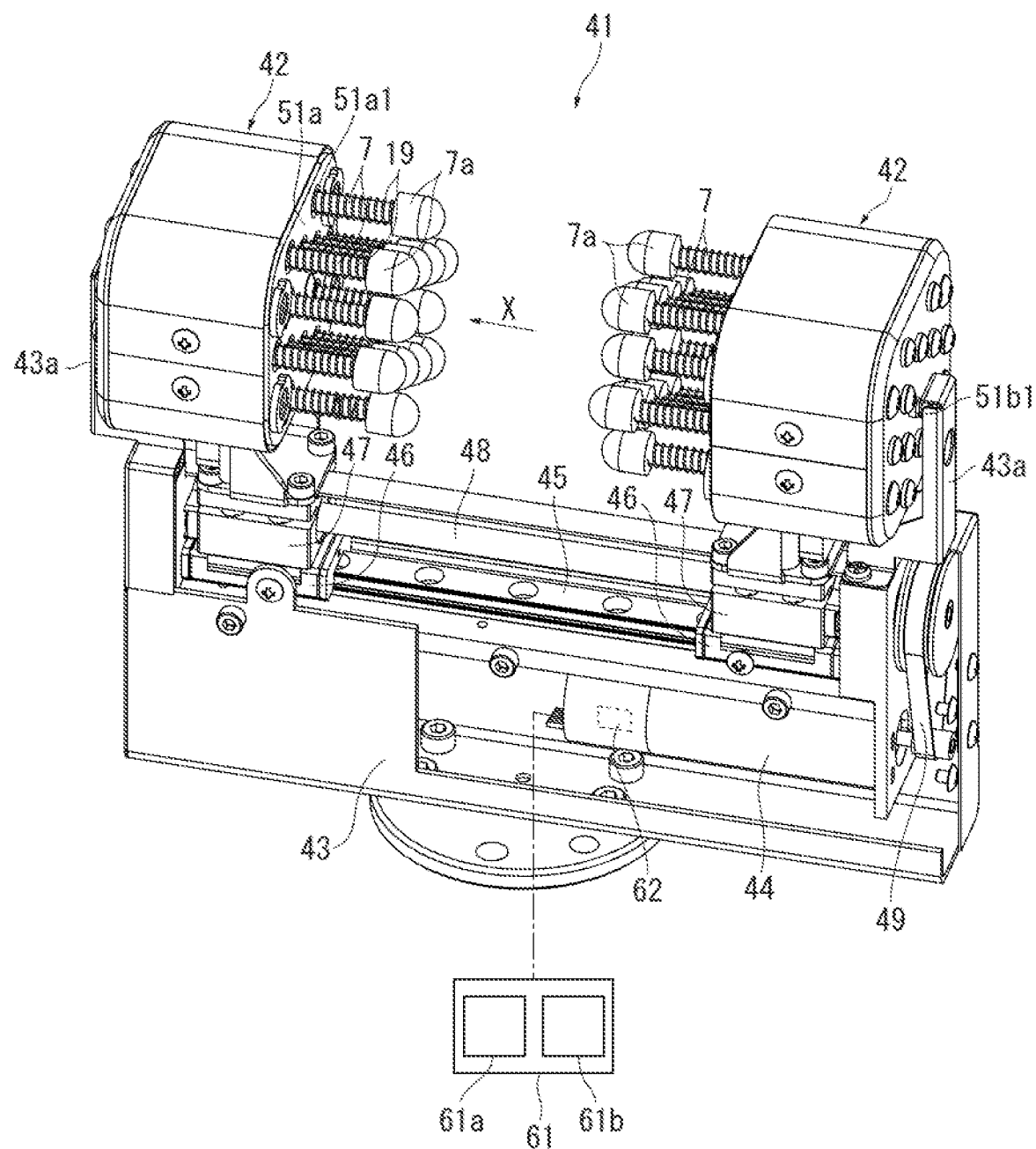
FIG. 5 is a perspective view of a workpiece holding apparatus of a second embodiment of the present invention (a state before holding a workpiece).
Figure 6:
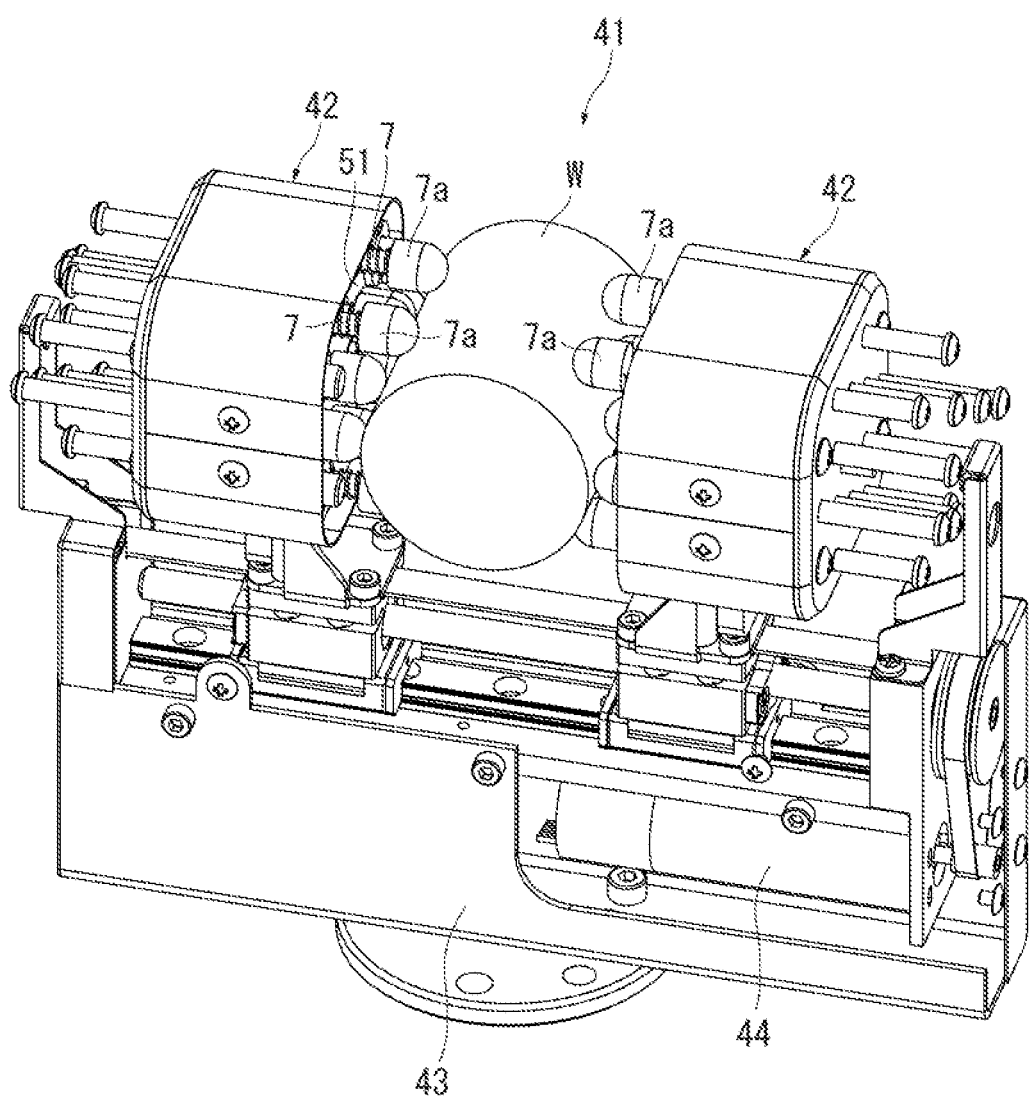
FIG. 6 is a perspective view of the workpiece holding apparatus of the second embodiment of the present invention (a state after holding the workpiece).

FIGS. 5 and 6 illustrate perspective views of a workpiece holding apparatus 41 of a second embodiment of the present invention. FIG. 5 illustrates initial positions of main bodies 42 (a state of not holding a workpiece W). FIG. 6 illustrates a state of holding the workpiece W. The workpiece holding apparatus 41 of the second embodiment is attached to a distal end shaft of an unillustrated robot, and is used as a hand of the robot.

A reference sign 43 denotes a base, the reference sign 42 denotes a pair of left and right main bodies, a reference sign 7 denotes shaft members, and a reference sign 51 denotes trigger members. In the first embodiment, the trigger members 16 come into direct contact with the workpiece W to switch the clamping devices 1 from the unclamping state to the clamping state, whereas in the second embodiment, as illustrated in FIG. 6, the trigger members 51 come into indirect contact with the workpiece W via contactors 7a of the shaft members 7 to switch the clamping devices 1 from the unclamping state to the clamping state.

As illustrated in FIG. 5, the pair of main bodies 42 is supported by the base 43 in such a manner as to be movable to and from the workpiece W. The movement of the main bodies 42 is guided by a linear guide. The linear guide includes a rail 45 that is secured to the base 43, and blocks 46 that are secured to the main bodies 42. A ball screw nut 47 is incorporated into each of the blocks 46. The ball screw nuts 47 are threadedly engaged with a screw shaft 48 having a right-handed and a left handed thread formed thereon. The rotation of a motor 44 is transferred to the screw shaft 48 via a transmission means 49 such as a belt pulley. When the screw shaft 48 rotates, the pair of main bodies 42 moves to and from the workpiece W.

Figure 7A:
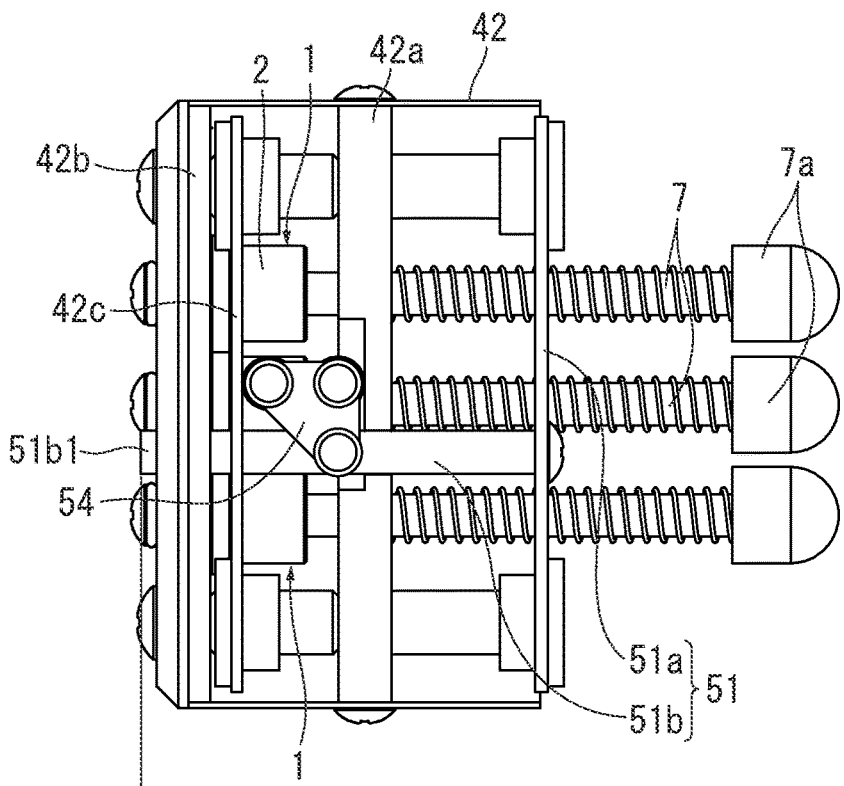
FIGS. 7(a) and 7(b) are horizontal cross-sectional views of a main body of the workpiece holding apparatus of the second embodiment of the present invention (FIG. 7(a) illustrates the unclamping state of the clamping devices, and FIG. 7(b) illustrates the clamping state).
Figure 7B:
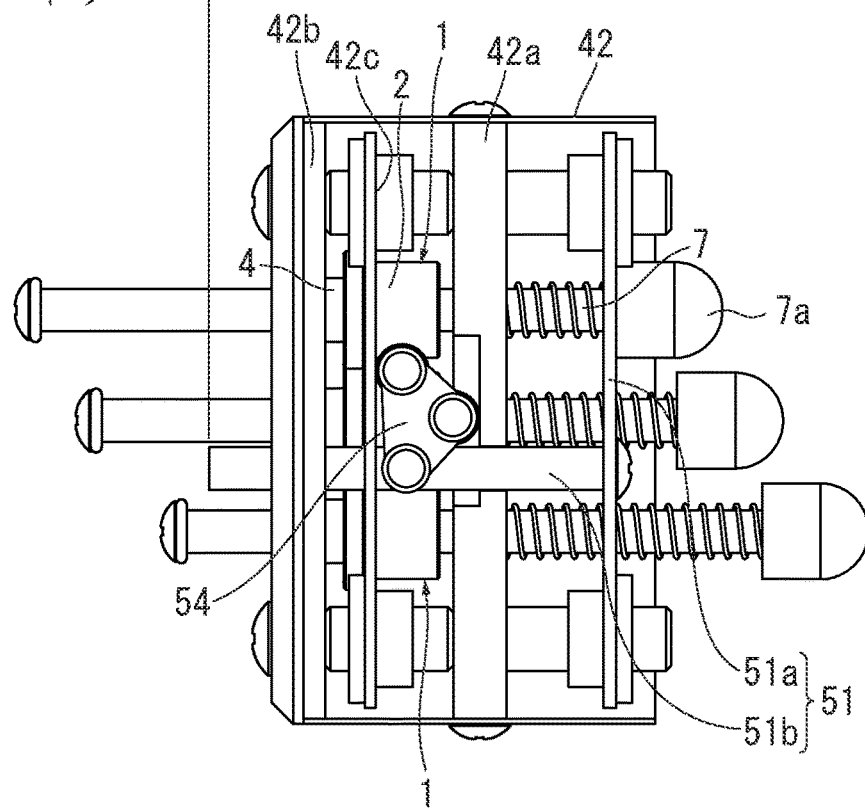

FIG. 7 illustrates the internal structure of the main body 42. FIG. 7(a) illustrates the unclamping state of the clamping devices 1, and FIG. 7(b) illustrates the clamping state of the clamping devices 1. As illustrated in FIG. 7, the shaft members 7 and the trigger member 51 are incorporated into the main body 42.

Figure 8A:
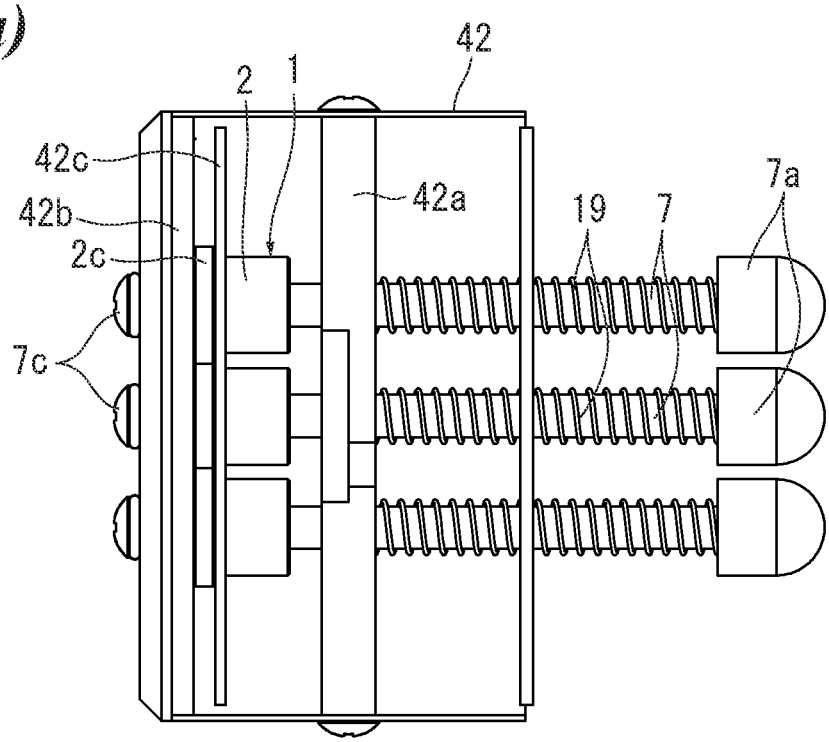
FIGS. 8(a) and 8(b) are horizontal cross-sectional views of shaft members of the workpiece holding apparatus of the second embodiment of the present invention (FIG. 8(a) illustrates the unclamping state of the clamping devices, and FIG. 8(b) illustrates the clamping state).
Figure 8B:
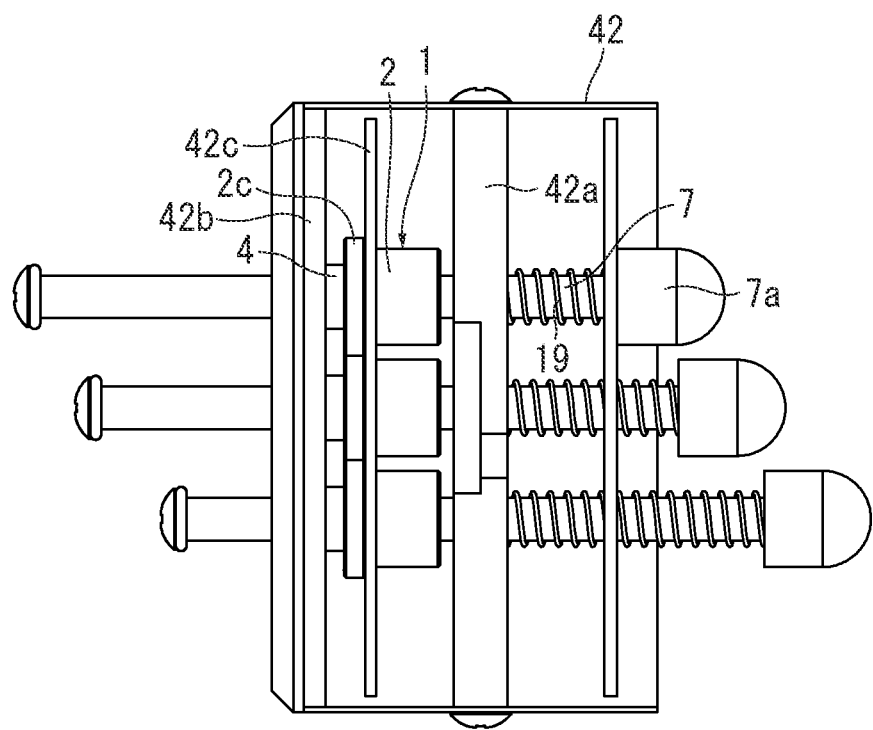

FIG. 8 illustrates the main body 42 and the shaft members 7. The main body 42 includes stationary plates 42a and 42b, and a movable plate 42c. Retainers 4 (refer to FIGS. 1 and 8(b)) of the clamping devices 1 are attached to the stationary plate 42b. Outer cylinders 2 of the clamping devices 1 are attached to the movable plate 42c. The movable plate 42c is not secured to the outer cylinders 2, but is simply in contact with flanges 2c of the outer cylinders 2 to ensure concentricity between the outer cylinders 2 and the shaft members 7. The movable plate 42c is caused by springs 5 (refer to FIG. 1) of the clamping devices 1 to bias the outer cylinders 2. A lever 54 (refer to FIG. 7(a)) of the trigger mechanism 14 is caused by the springs 5 of the clamping devices 1 to bias the movable plate 42c.

Figure 9A:
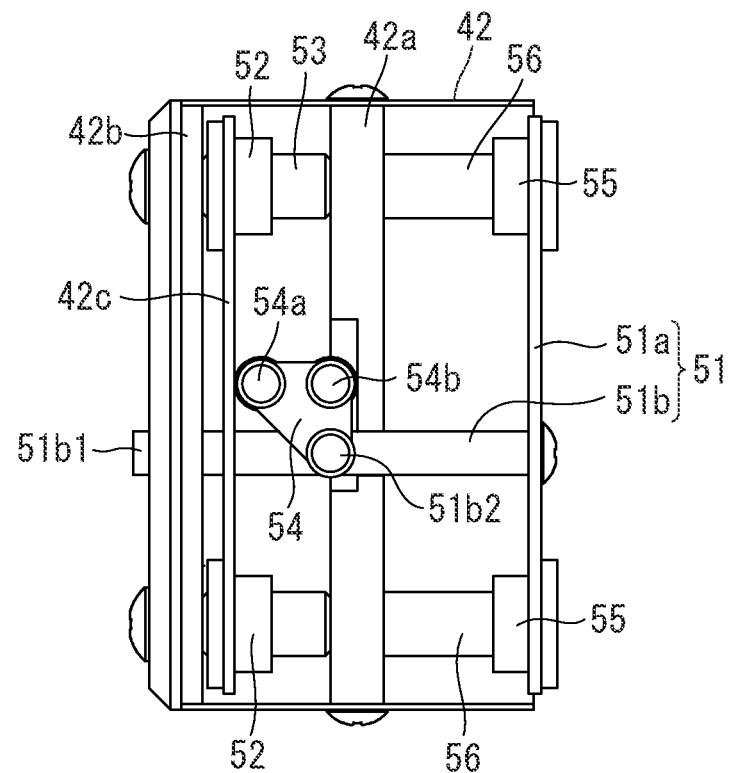
FIGS. 9(a) and 9(b) are horizontal cross-sectional views of a trigger member of the workpiece holding apparatus of the second embodiment of the present invention (FIG. 9(a) illustrates an initial position of the trigger member, and FIG. 9(b) illustrates an operation position of the trigger member).

As illustrated in FIG. 9(a), linear motion bearings 52 such as bushings are attached to the movable plate 42c. Shafts 53 that are each inserted into the linear motion bearing 52 are secured to the stationary plates 42a and 42b. The movement of the movable plate 42c is guided by the linear motion bearings 52 and the shafts 53.

As illustrated in FIG. 8(a), the shaft members 7 are supported by the main body 42 in such a manner as to be movable in the axial direction. Linear motion bearings (not illustrated) such as ball bushings that guide the axial movement of the shaft members 7 are attached to the stationary plates 42a and 42b. The retainers 4 of the clamping devices 1 are attached to the stationary plate 42b via the linear motion bearings. A distal end of each of the shaft members 7 is provided with a respective contactor 7a that can come into contact with the workpiece W. The type of contactors 7a is not particularly limited. Examples of the contactors 7a include a pointed bullet-shaped or conical rubber or suction pad. Springs 19 that each extrude a respective shaft member 7 from the main body 42 are provided between a respective contactor 7a and the stationary plate 42a. The extruded state of each shaft member 7 is maintained by a stopper 7c at a rear end of the each shaft member 7 hitting the stationary plate 42b.

As illustrated in FIG. 9(a), the trigger member 51 includes a plate portion 51a, and a shaft portion 51b that is secured to the plate portion 51a. The plate portion 51a covers a workpiece W side of the main body 42 (refer to FIG. 5). The plate portion 51a has through-holes 51a1 (refer to FIG. 5) formed therein through each of which a respective shaft member 7 is inserted. The diameter of the through-holes 51a1 is greater than the diameter of the springs 19 that are each wound around the respective shaft member 7, and is less than the diameter of the contactors 7a. When the contactors 7a come into contact with the workpiece W and the shaft members 7 move back, a rear end of each of the contactors 7a comes into contact with the plate portion 51a (refer to FIG. 7(b)). A rear end 51b1 of the shaft portion 51b protrudes from the main body 42. The rear end 51b1 of the shaft portion 51b can come into contact with a horn-like return member 43a (refer to FIG. 5) that is secured to the base 43.

As illustrated in FIG. 9(a), the trigger member 51 is supported by the main body 42 in such a manner as to be movable in the axial direction. Linear motion bearings 55 such as bushings are secured to the plate portion 51a of the trigger member 51. Shafts 56 that are each inserted into a respective linear motion bearing 55 are secured to the stationary plate 42a. Moreover, a linear motion bearing (not illustrated) such as a bushing that guides the movement of the shaft portion 51b of the trigger member 51 is attached to the stationary plate 42a.

The lever 54 is coupled to the shaft portion 51b in such a manner as to be tiltable on a pivot 51b2. The lever 54 is, for example, triangular. Two corners of the lever 54 excluding the pivot 51b2 are provided with bearings 54a and 54b. The lever 54 changes the space between the stationary plate 42a and the movable plate 42c with the movement of the trigger member 51 relative to the main body 42.

Figure 9B:
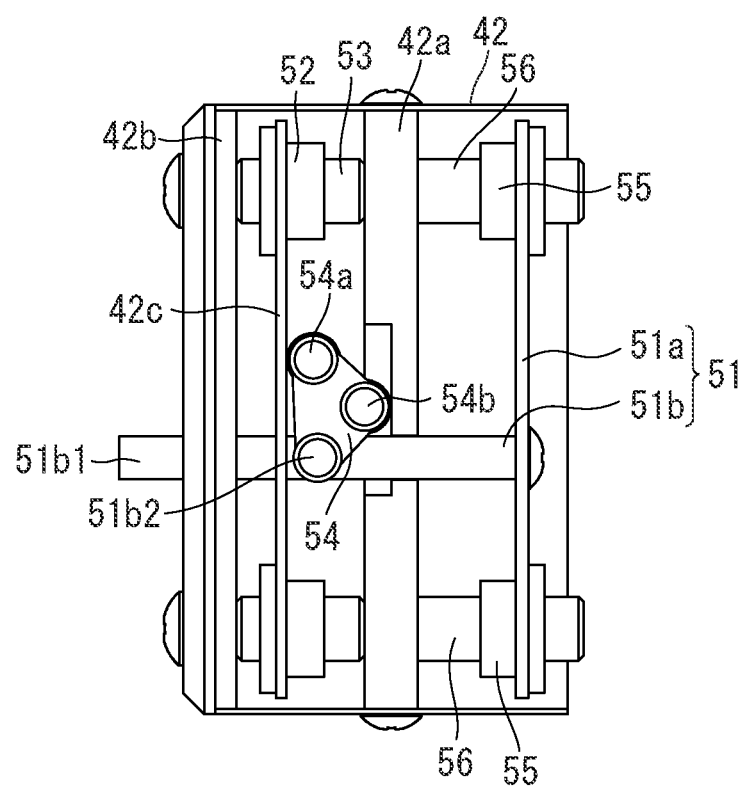
Figure 10:
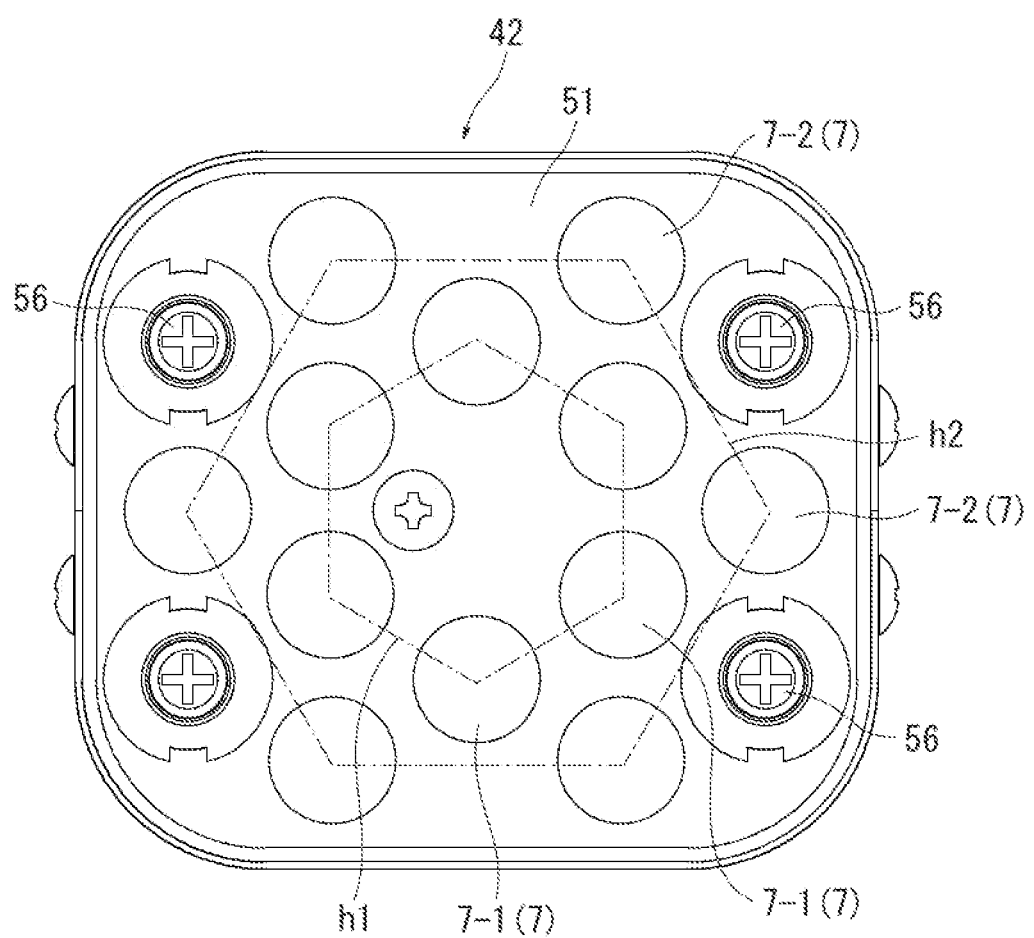
FIG. 10 is an X arrow view of FIG. 5.

FIG. 10 is an X arrow view of FIG. 5, and illustrates an axial view of the main body 42. As illustrated in FIG. 5, a plurality of the shaft members 7 is placed parallel to each other in the main body 42. As illustrated in FIG. 10, the plurality of the shaft members 7 includes first shaft members 7-1 placed at the vertices of a first regular hexagon h1, and second shaft members 7-2 placed at the vertices of a second regular hexagon h2 having longer sides than the first regular hexagon h1 and substantially displaced 30° from the first regular hexagon h1 as viewed in the axial direction of the main body 42. Two inner first shaft members 7-1 and one outer second shaft member 7-2 form a triangle, preferably a regular triangle. The shaft portion 51b of the trigger member 51 and the lever 54 (refer to FIG. 9) are placed inside the first regular hexagon h1. For example, four shafts 56 (refer to FIG. 9(a)) to guide the trigger member 51 and, for example, four shafts 53 (refer to FIG. 9(a)) to guide the movable plate 42c are placed outside the second regular hexagon h2. The shafts 53 and 56 are placed equidistant from each pair of adjacent second shaft members 7-2 as viewed in the axial direction of the main body 42.

The first shaft members 7-1 and the second shaft members 7-2 may be placed at the vertices of regular n-gons (n≥4), and the second regular n-gon h2 may be displaced 180°/n from the first regular n-gon h1. Moreover, one or more shaft members 7 may be placed inside the first regular n-gon h1, and one or more shaft members 7 may be placed outside the second regular n-gon h2. Furthermore, the number of the shafts 56 that guide the trigger member 51 may be equal to or less than three, and the number of the shafts 53 that guide the movable plate 42c may be equal to or less than three.

The operation of the holding apparatus 41 of the second embodiment is described. As illustrated in FIG. 5, when the motor 44 moves the main body 42 to the initial position, the rear end 51b1 of the shaft portion 51b of the trigger member 51 comes into contact with the return member 43a. As a result, the trigger member 51 moves to the initial position, and thus the clamping devices 1 switch from the clamping state to the unclamping state.

In other words, as illustrated in FIG. 7(a), when the rear end 51b1 of the shaft portion 51b of the trigger member 51 comes into contact with the return member 43a, the trigger member 51 moves δ to the right relative to the main body 42. Consequently, the lever 54 tilts, the space between the stationary plate 42a and the movable plate 42c extends, the outer cylinders 2 of the clamping devices 1 move to the left relative to the retainers 4, and the clamping devices 1 switch from the clamping state to the unclamping state.

Next, when the motor 44 moves the main body 42 toward the workpiece W, the contactors 7a of the shaft members 7 come into contact with the workpiece W, and then the shaft members 7 follow the shape of the workpiece W as illustrated in FIG. 6. The main body 42 moves further toward the workpiece W. When the contactors 7a of the shaft members 7 come into contact with the trigger member 51, the trigger member 51 comes into contact with the workpiece W via the contactor 7a. As a result, the trigger member 51 moves relative to the main body 42. Consequently, the clamping devices 1 switch from the unclamping state to the clamping state.

In other words, as illustrated in FIG. 7(b), when the trigger member 51 moves δ to the left relative to the main body 42, the lever 54 tilts, and the movable plate 42c moves closer to the stationary plate 42a. Consequently, the outer cylinders 2 of the clamping devices 1 move to the right in FIG. 7(b) relative to the retainers 4, and the clamping devices 1 switch from the unclamping state to the clamping state. The clamping devices 1 restrict one-way (to the left) movement of the shaft members 7. As a result, the shaft members 7 can hold the workpiece W.

As illustrated in FIG. 6, when the trigger member 51 is operated and the clamping devices 1 switch from the unclamping state to the clamping state, a load acting on the motor 44 increases to increase an electric current flowing through the motor 44. A motor control device 61 (refer to FIG. 5) stops the motor 44 when the electric current flowing through the motor 44 increases.

As illustrated in FIG. 5, the electric current flowing through the motor 44 is detected by a current sensor 62. The motor control device 61 includes a host controller 61a that gives commands to the motor 44, and a driver 61b that supplies power to the motor 44. The host controller 61a is a computer including a storage device where a program for controlling the motor 44 is stored, RAM that stores a current value, and a processor that executes the program. The host controller 61a stops the motor 44 when the current value detected by the current sensor 62 is equal to or greater than a threshold.

Up to this point, the configuration and operation of the workpiece holding apparatus 41 of the second embodiment have been described. The workpiece holding apparatus 41 of the second embodiment has the following effects:

The trigger member 51 comes into indirect contact with the workpiece W via the contactor 7a of the shaft member 7, thus moving relative to the main body 42. As a result, the clamping devices 1 switch from the unclamping state to the clamping state. Hence, it is possible to switch the clamping devices 1 from the unclamping state to the clamping state without the use of an air cylinder. Moreover, the trigger member 51 comes into indirect contact with the workpiece W via the contactor 7a. Therefore, it is possible to prevent damage to the workpiece W.

The trigger member 51 includes the plate portion 51a. Therefore, wherever on the workpiece W a protuberance is, the contactor 7a that is retracted most after coming into contact with the workpiece W can press the plate portion 51a. Hence, the trigger member 51 can be operated without regard to the shape of the workpiece W.

The plurality of the shaft members 7 includes the first shaft members 7-1 placed at the vertices of the first regular n-gon h1, and the second shaft members 7-2 placed at the vertices of the second regular n-gon h2 as viewed in the axial direction of the main body 42. As a result, two adjacent inner first shaft members 7-1 and one outer second shaft member 7-2 can form a triangle. Consequently, the plurality of the shaft members 7 can be placed in a densely packed manner.

The shaft portion 51b and the lever 54 are placed inside the first regular n-gon h1 as viewed in the axial direction of the main body 42. As a result, it is possible to make effective use of space and make the main body 42 compact.

The shafts 56 that guide the trigger member 51, and the shafts 53 that guide the movable plate 42c are placed outside the second regular n-gon h2 as viewed in the axial direction of the main body 42. As a result, it is possible to make effective use of space and make the main body 42 compact.

The pair of main bodies 42 is placed in such a manner as to sandwich the workpiece W, and is driven by the motor 44. When the current value of the motor 44 is equal to or greater than the threshold, the motor 44 is stopped. Therefore, whether the workpiece W is thin or thick, the motor 44 can be controlled with the same program. Whether the workpiece W is hard or soft, the workpiece can be held on the basis of an adjustment to the threshold in accordance with the hardness of the workpiece.

Third Embodiment

Figure 11A:
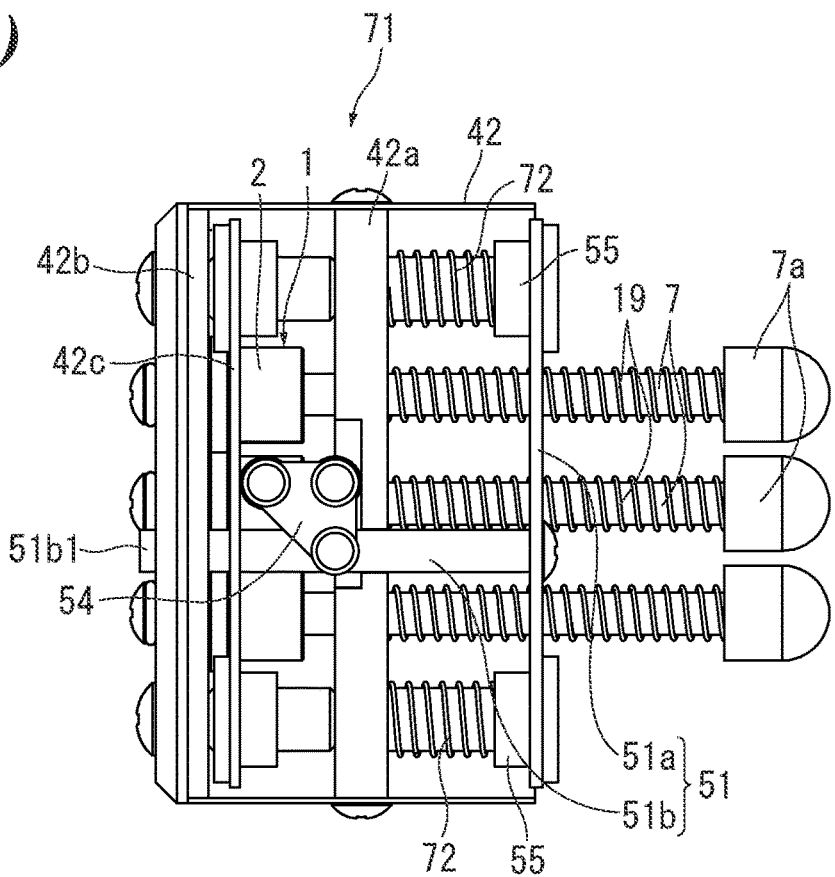
FIGS. 11(a) and 11(b) are horizontal cross-sectional views of a main body of a workpiece holding apparatus of a third embodiment of the present invention (FIG. 11(a) illustrates the unclamping state of the clamping devices, and FIG. 11(b) illustrates the clamping state).
Figure 11B:
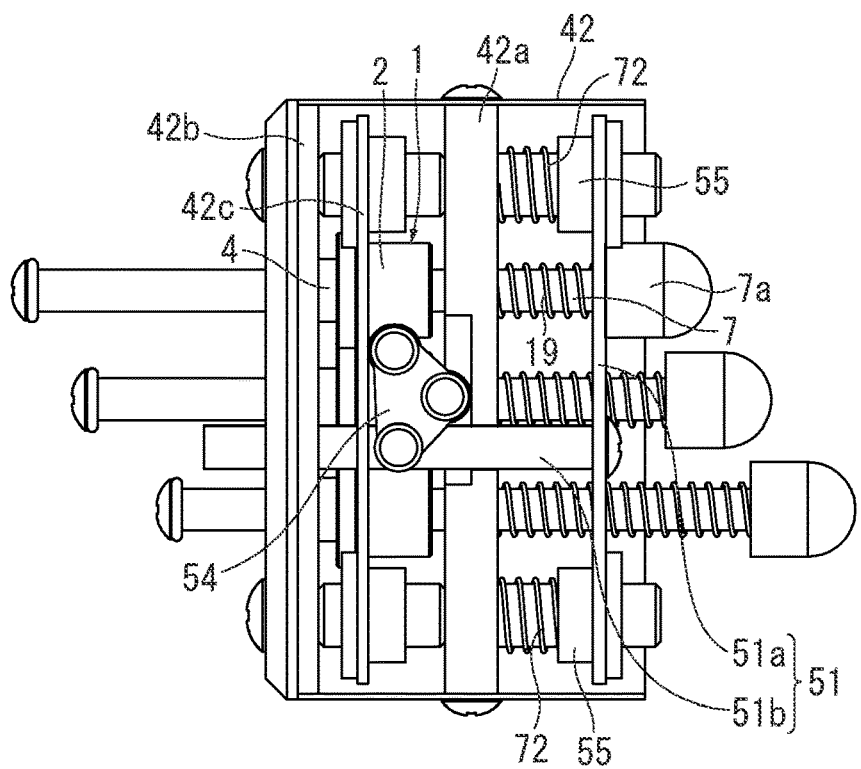

FIG. 11 illustrates a workpiece holding apparatus 71 of a third embodiment of the present invention. FIG. 11(a) illustrates the unclamping state of clamping devices 1 as in FIG. 7(a), and FIG. 11(b) illustrates the clamping state of the clamping devices 1 as in FIG. 7(b). The configurations of the main bodies, the shaft members, the clamping devices, the trigger members, and the levers are the same as those of the second embodiment. Therefore, the same reference signs are assigned to the configurations thereof, and descriptions thereof are omitted.

In the second embodiment, the shaft portion 51b of the trigger member 51 comes into contact with the return member 43a, and then the trigger member 51 returns to the initial position (refer to FIGS. 5 and 7(a)), whereas in the third embodiment, springs 72 return the trigger member 51 to the initial position as illustrated in FIG. 11(a).

The springs 72 are each disposed between the stationary plate 42a of the main body 42 and a respective linear motion bearing 55. As illustrated in FIG. 11(b), when the main body 42 moves away from the workpiece W with the clamping devices 1 in the clamping state, the springs 19 move the contactors 7a of the shaft members 7 away from the plate portion 51a. As illustrated in FIG. 11(a), when the contactors 7a move away from the plate portion 51a, the trigger member 51 is moved to the right by the springs 72 and then returns to the initial position. Consequently, the lever 54 tilts, and the clamping devices 1 switch from the clamping state to the unclamping state.

According to the workpiece holding apparatus 71 of the third embodiment, the springs 72 return the trigger member 51 to the initial position. Therefore, there is no need to provide the horn-like return member 43a to the base 43. Consequently, it is possible to easily change the stroke of the main body 42 by increasing the stroke and by changing the position where the workpiece holding apparatus 71 is attached.

Fourth Embodiment

Figure 12A:
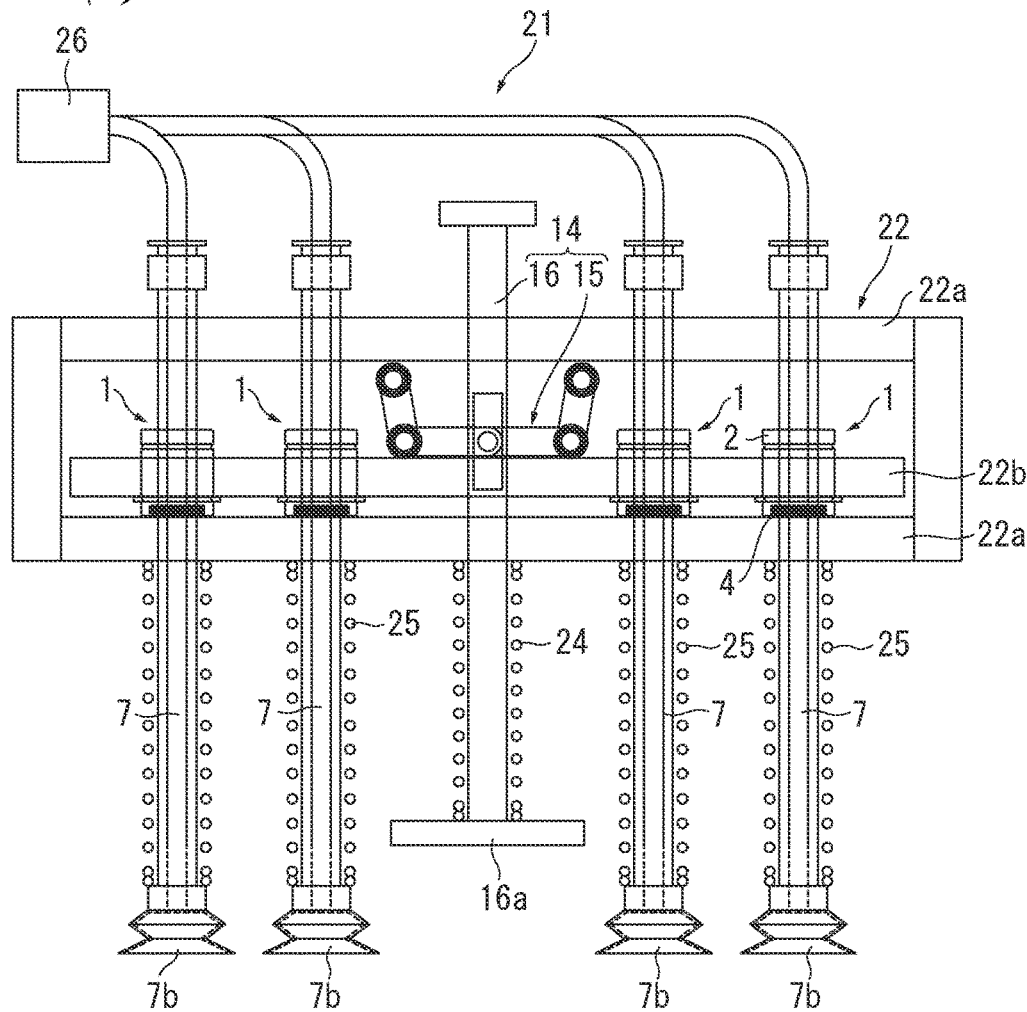
FIGS. 12(a) and 12(b) are diagrams illustrating a workpiece holding apparatus of a fourth embodiment of the present invention (FIG. 12(a) is a side view (the unclamping state), and FIG. 12(b) is a bottom view).
Figure 12B:
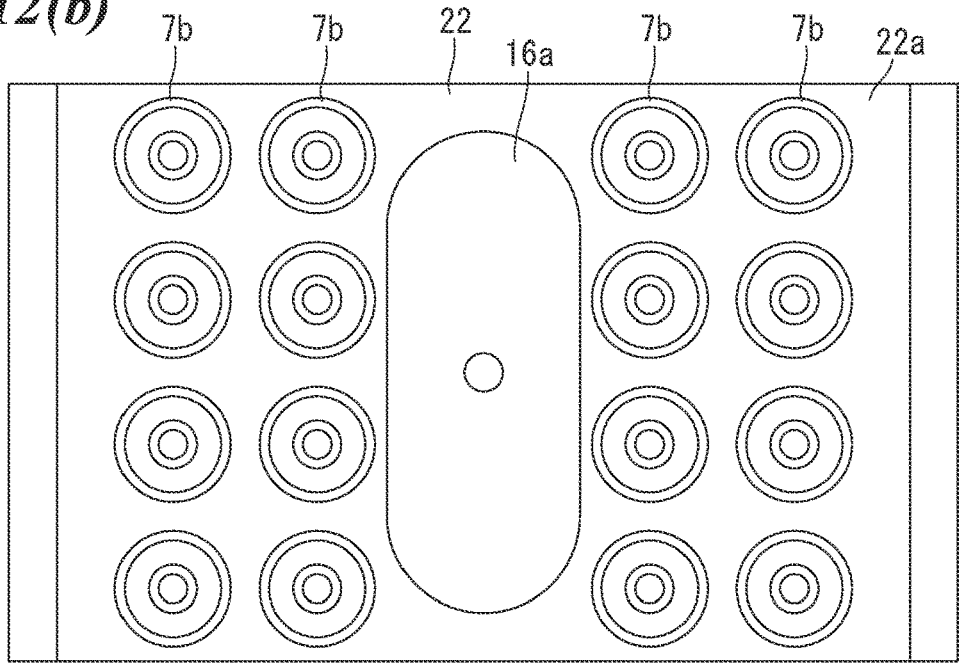

FIGS. 12(a) and 12(b) illustrate a workpiece holding apparatus 21 of a fourth embodiment of the present invention. FIG. 12(a) is a side view, and FIG. 12(b) is a bottom view. The workpiece holding apparatus 21 of the fourth embodiment is also attached to a distal end shaft of a robot, and is used as a hand of the robot. A plurality of shaft members 7, a plurality of clamping devices 1, and a trigger mechanism 14 are placed in a main body 22. Each of the shaft members 7 facing in the vertical direction is provided at a lower end thereof with a suction pad 7b as a suction member that suctions a workpiece W. The shaft members 7 are hollow, and are connected to a vacuum generator 26 via flexible hoses. As illustrated in FIG. 12(b), the shaft members 7 and the suction pads 7b are placed in a matrix (rows and columns) in the main body 22. The shaft members 7 are biased into a protruding state by springs 25.

In the first embodiment, the trigger member 16 comes into contact with the return member 23, thus moving relative to the main body 12 to switch the clamping devices 1 from the clamping state to the unclamping state (refer to FIG. 3(a)), whereas in the fourth embodiment, a spring 24 that biases the trigger member 16 into the protruding state moves the trigger member 16 relative to the main body 22 to switch the clamping devices 1 from the clamping state to the unclamping state.

The reference sign 22 denotes a main body, a reference sign 22a denotes a stationary plate, and a reference sign 22b denotes a movable plate. Ball bushings (not illustrated) that guide the movement of the shaft members 7 are attached to the stationary plate 22a. Retainers 4 of the clamping devices 1 are secured to the stationary plate 22a via the ball bushings (not illustrated). Outer cylinders 2 of the clamping devices 1 are attached to the movable plate 22b. The configuration of the clamping devices 1 is the same as that of the clamping devices 1 of the first embodiment.

The reference sign 16 denotes a trigger member, and a reference sign 15 denotes levers. A distal end 16a of the trigger member 16 is in the form of a flange, and can come into contact with the workpiece W. The levers 15 are placed between the stationary plate 22a and the movable plate 22b. The spring 24 that biases the trigger member 16 into the protruding state is provided between the distal end 16a of the trigger member 16 and the stationary plate 22a. As in the second embodiment, it may be configured in such a manner that: the distal end 16a of the trigger member 16 has a plate shape having substantially the same size as the main body 22, through-holes through each of which a respective shaft member 7 is inserted are formed in the plate-shaped distal end 16a, and the suction pads 7b come into contact with the distal end 16a.

Figure 13:
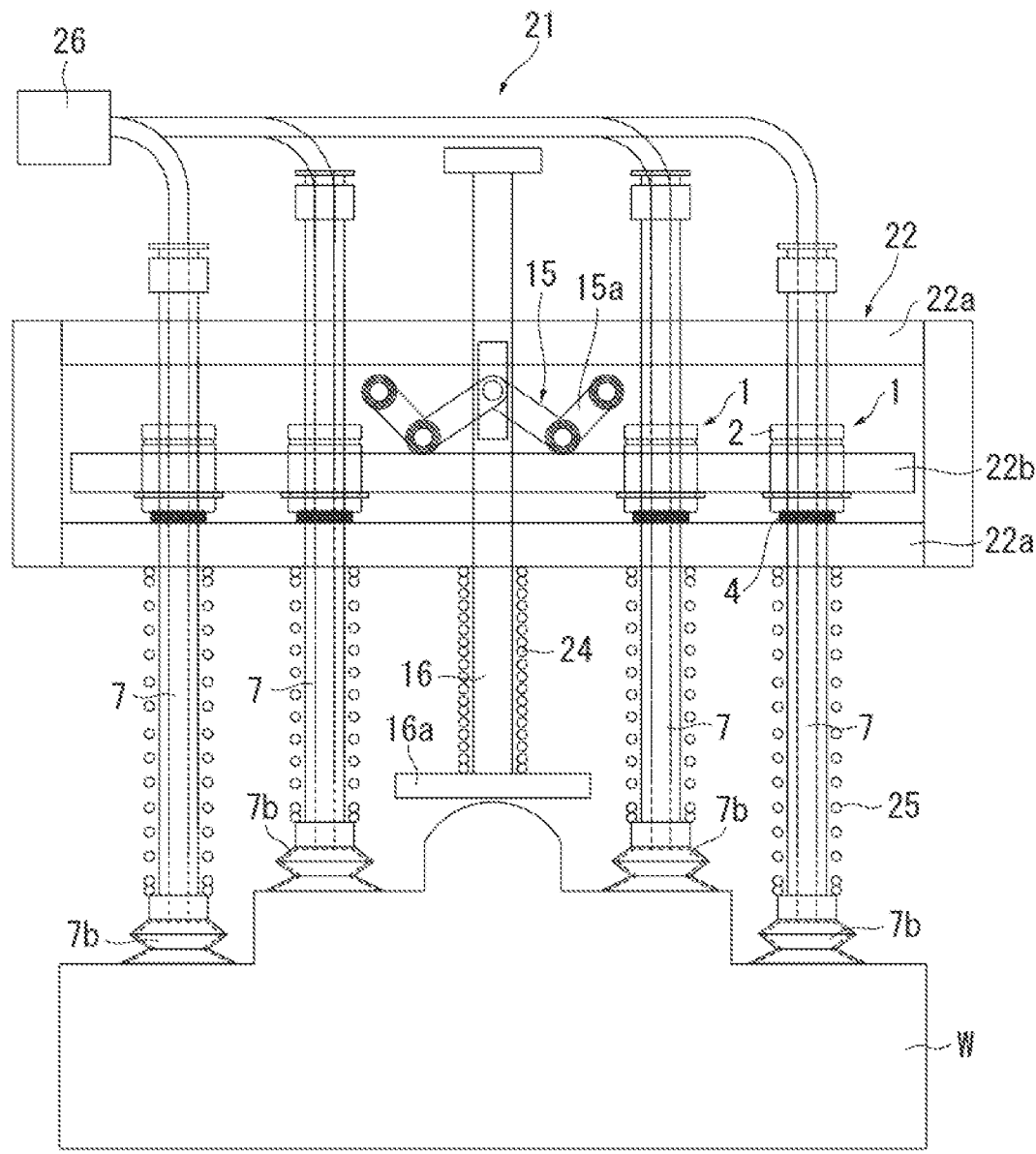
FIG. 13 is a side view of the workpiece holding apparatus of the fourth embodiment of the present invention (the clamping state).

FIG. 12(a) illustrates the unclamping state of the clamping devices 1, and FIG. 13 illustrates the clamping state. When the main body 22 descends toward the workpiece W with the clamping devices 1 in the unclamping state as illustrated in FIG. 12(a), the suction pads 7b of the shaft members 7 come into contact with the workpiece W, and then the shaft members 7 follow the shape of the workpiece W against the spring forces of the springs 25 as illustrated in FIG. 13.

When the main body 22 descends further toward the workpiece W, the distal end 16a of the trigger member 16 comes into contact with the workpiece W, and then the trigger member 16 ascends against the spring force of the spring 24. At this point in time, as illustrated in FIG. 13, short side portions 15a of the levers 15 rotate in such a manner as to incline between the stationary plate 22a and the movable plate 22b, the outer cylinders 2 ascend relative to the retainers 4, and the clamping devices 1 switch from the unclamping state to the clamping state. A vacuum is created in each of the suction pads 7b with the shaft members 7 secured by the clamping devices 1, and thus it is possible to hold the workpiece W.

On the other hand, the vacuum in each of the suction pads 7b is released to separate the main body 22 from the workpiece W, which returns the trigger member 16 to an initial position illustrated in FIG. 12(a) by use of the biasing force of the spring 24. At this point in time, the short side portions 15a of the levers 15 rotate in such a manner as to stand up between the stationary plate 22a and the movable plate 22b, the outer cylinders 2 descend relative to the retainers 4, and the clamping devices 1 switch from the clamping state to the unclamping state.

The fourth embodiment has the following effects:

The trigger member 16 comes into contact with the workpiece W, thus moving relative to the main body 22. As a result, the clamping devices 1 switch from the unclamping state to the clamping state. Hence, it is possible to switch the clamping devices 1 from the unclamping state to the clamping state without the use of an air cylinder.

The spring 24 returns the trigger member 16 to the initial position. Hence, it is possible to switch the clamping devices 1 from the clamping state to the unclamping state without the use of an air cylinder.

The shaft members 7 are formed hollow, and the suction pad 7b is provided to the distal end of each of the shaft members 7. Hence, it is possible to suction the workpiece W.

Fifth Embodiment

Figure 14A:
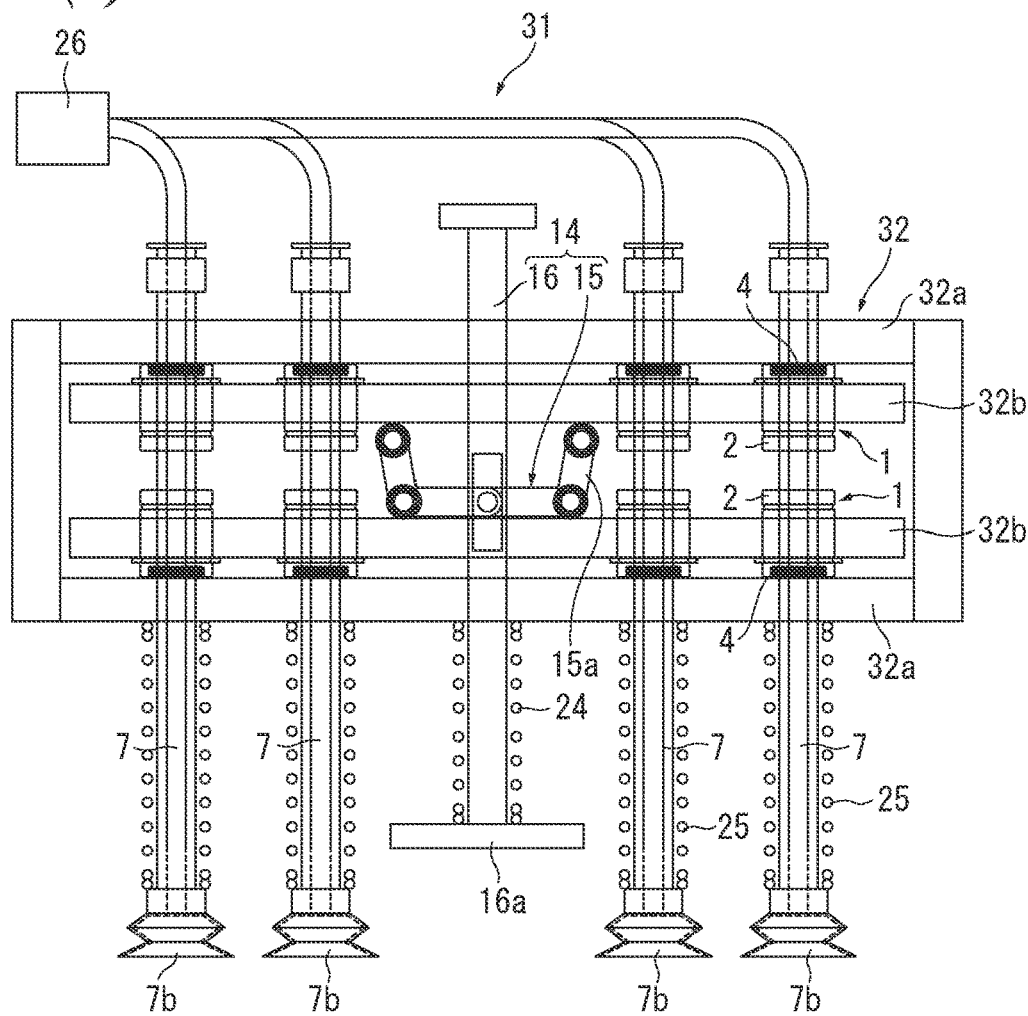
FIGS. 14(a) and 14(b) are diagrams illustrating a workpiece holding apparatus of a fifth embodiment of the present invention (FIG. 14(a) is a side view (the unclamping state), and FIG. 14(b) is a bottom view).
Figure 14B:
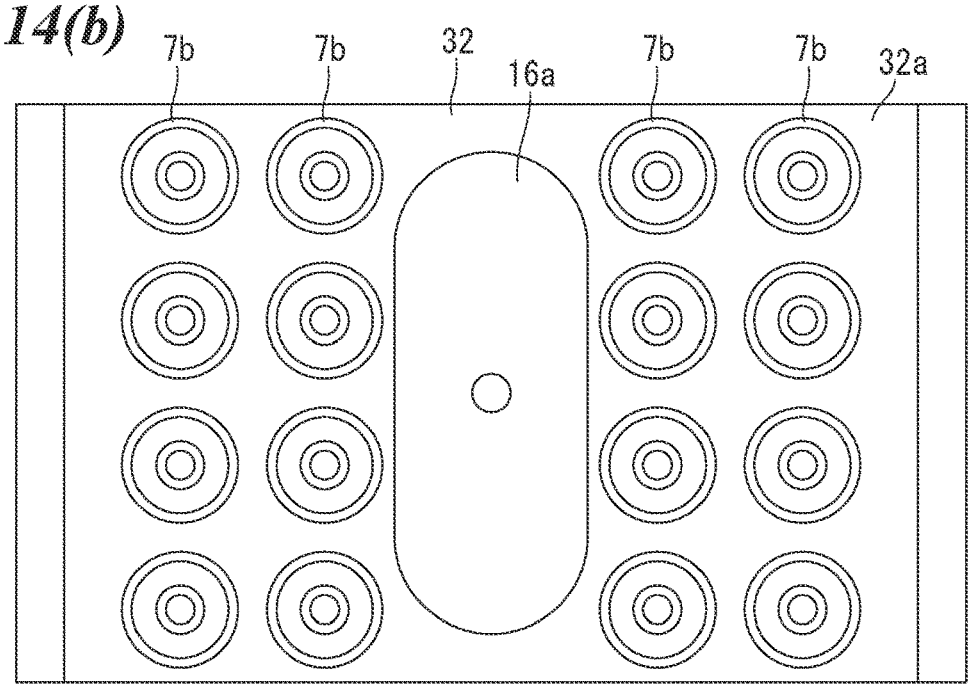

FIGS. 14(a) and 14(b) illustrate a workpiece holding apparatus 31 of a fifth embodiment of the present invention. FIG. 14(a) is a side view, and FIG. 14(b) is a bottom view. In the fifth embodiment, a plurality of shaft members 7, a plurality of clamping devices 1, and a trigger mechanism 14 are placed in a main body 32 as in the fourth embodiment. A distal end of each of the shaft members 7 is provided with a suction pad 7b as a suction member that suctions a workpiece W. The shaft members 7 are hollow, and are connected to a vacuum generator 26. The configurations of the shaft members 7, the trigger mechanism 14, and the vacuum generator 26 are the same as those of the fourth embodiment. Therefore, the same reference signs are assigned to the configurations thereof, and descriptions thereof are omitted.

In the fourth embodiment, one clamping device 1 is provided to each of the shaft members 7 to restrict unidirectional (one-way) movement of the shaft members 7, whereas in the fifth embodiment, two clamping devices 1 are provided to each of the shaft members 7 to restrict bidirectional (two-way) movement of the shaft members 7.

The main body 32 includes two movable plates 32b and two stationary plates 32a. Retainers 4 of the clamping devices 1 are secured to each of the stationary plates 32a via unillustrated ball bushings. Outer cylinders 2 of the clamping devices 1 are attached to the movable plates 32b. Two clamping devices 1 placed on each of the shaft members 7 are placed in such a manner that large diameter portions of wedge-shape spaces of the clamping devices 1 face each other. The configuration of the clamping devices 1 themselves is the same as that of the clamping devices 1 in the first embodiment. Therefore, the same reference signs are assigned to the configuration thereof, and descriptions thereof are omitted.

Figure 15:
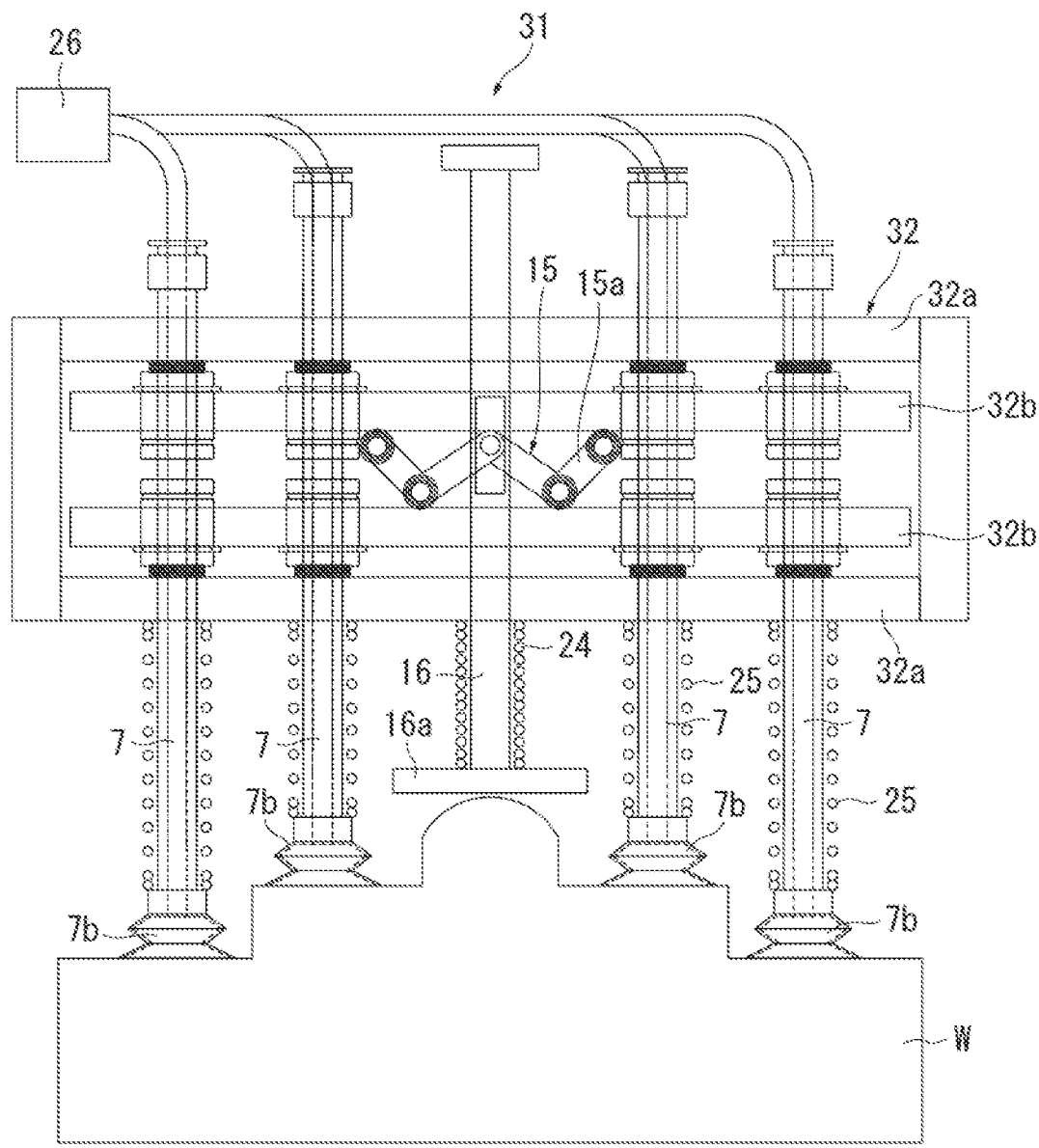
FIG. 15 is a side view of the workpiece holding apparatus of the fifth embodiment of the present invention (the clamping state).

The levers 15 of the trigger mechanism 14 are placed between the two movable plates 32b. FIG. 14(a) illustrates the unclamping state, and FIG. 15 illustrates the clamping state. When the main body 32 descends toward the workpiece W in the unclamping state as illustrated in FIG. 14(a), the suction pads 7b of the shaft members 7 come into contact with the workpiece W, and the shaft members 7 follow the shape of the workpiece W against the spring forces of the springs 25 as illustrated in FIG. 15.

When the main body 32 descends further toward the workpiece W, the distal end 16a of the trigger member 16 comes into contact with the workpiece W, and then the trigger member 16 ascends with respect to the main body 32 against the spring force of the spring 24. At this point in time, as illustrated in FIG. 15, the short side portions 15a of the levers 15 rotate in such a manner as to incline between the two movable plates 32b. Each two outer cylinders 2 moves closer to each other. The clamping devices 1 switch from the unclamping state to the clamping state. A vacuum is created in each of the suction pads 7b with the shaft members 7 secured by the clamping devices 1, and thus it is possible to hold the workpiece W.

On the other hand, the vacuum in each of the suction pads 7b is released to separate the main body 32 from the workpiece W, which returns the trigger member 16 to a return position illustrated in FIG. 14(a) by use of the biasing force of the spring 24. At this point in time, as illustrated in FIG. 14(a), the short side portions 15a of the levers 15 rotate in such a manner as to stand up between the two movable plates 32b, the each two outer cylinders 2 is separated, and the clamping devices 1 switch from the clamping state to the unclamping state.

The fifth embodiment has similar effects to the fourth embodiment. In addition, two clamping devices 1 are provided to each of the shaft members 7 to restrict the bidirectional (two-way) movement of the shaft members 7. Therefore, there is the effect of enabling the stable holding of the workpiece W.

Sixth Embodiment

Figure 16A:
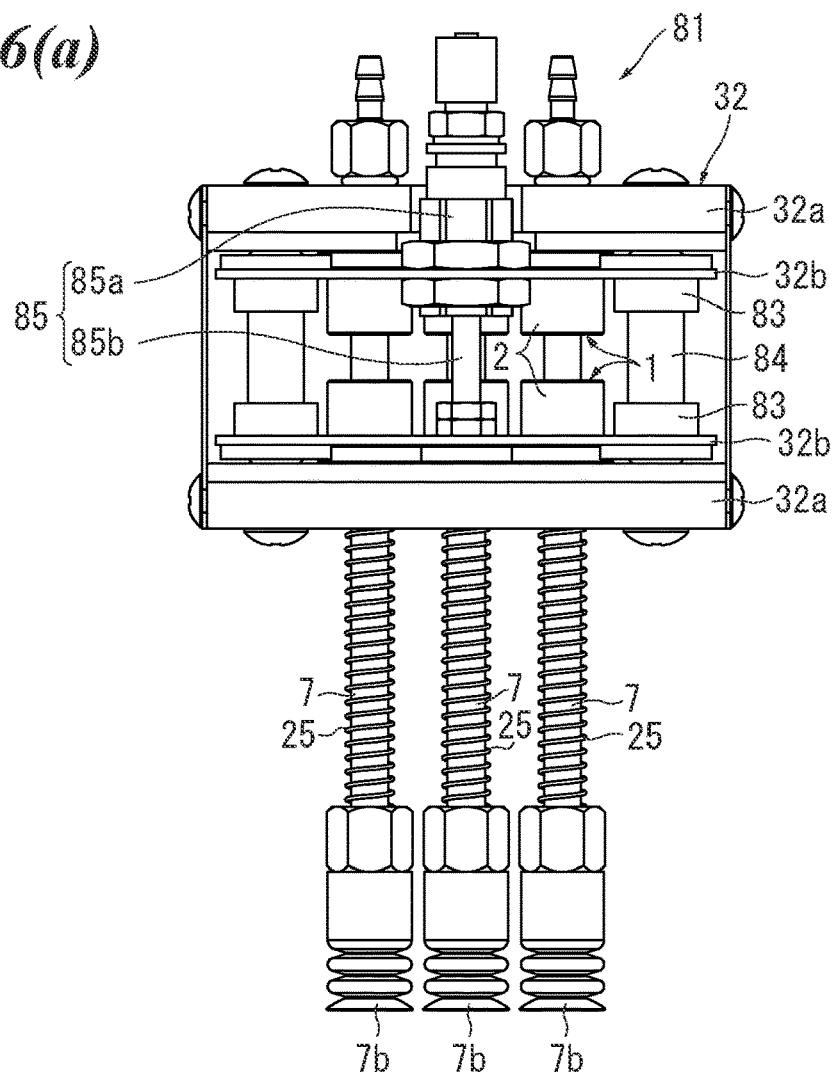
FIGS. 16(a) and 16(b) are diagrams illustrating a workpiece holding apparatus of a sixth embodiment of the present invention (FIG. 16(a) is a side view (the unclamping state), and FIG. 16(b) is a bottom view).
Figure 16B:
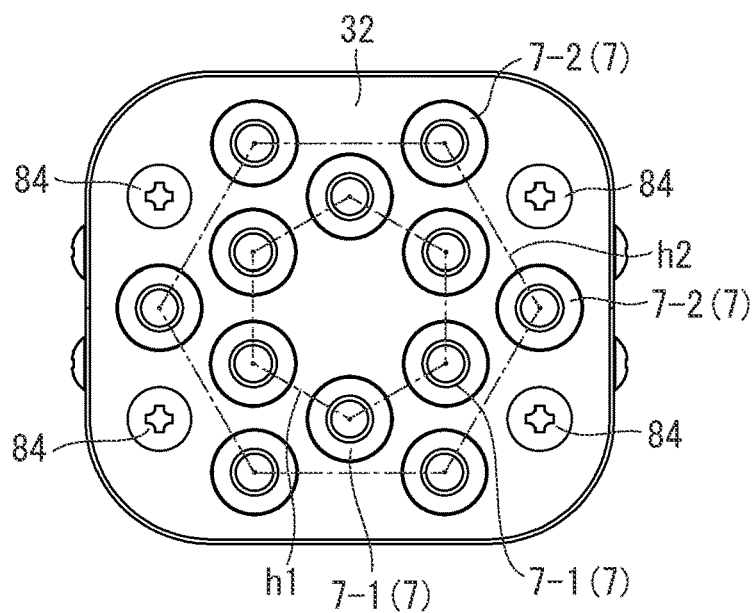

FIGS. 16(a) and 16(b) illustrate a workpiece holding apparatus 81 of a sixth embodiment of the present invention.

FIG. 16(a) is a side view, and FIG. 16(b) is a bottom view. A plurality of shaft members 7, and a plurality of clamping devices 1 are placed in a main body 32 also in the sixth embodiment. A distal end of each of the shaft members 7 is provided with a suction pad 7b that suctions a workpiece W. The shaft members 7 are hollow, and are connected to an unillustrated vacuum generator. Two clamping devices 1 are provided to each of the shaft members 7 to restrict bidirectional (two-way) movement of the shaft members 7. The configurations of the main body 32, the shaft members 7, and the clamping devices 1 are the same as those of the fifth embodiment. Therefore, the same reference signs are assigned to the configurations thereof, and descriptions thereof are omitted.

Figure 17:
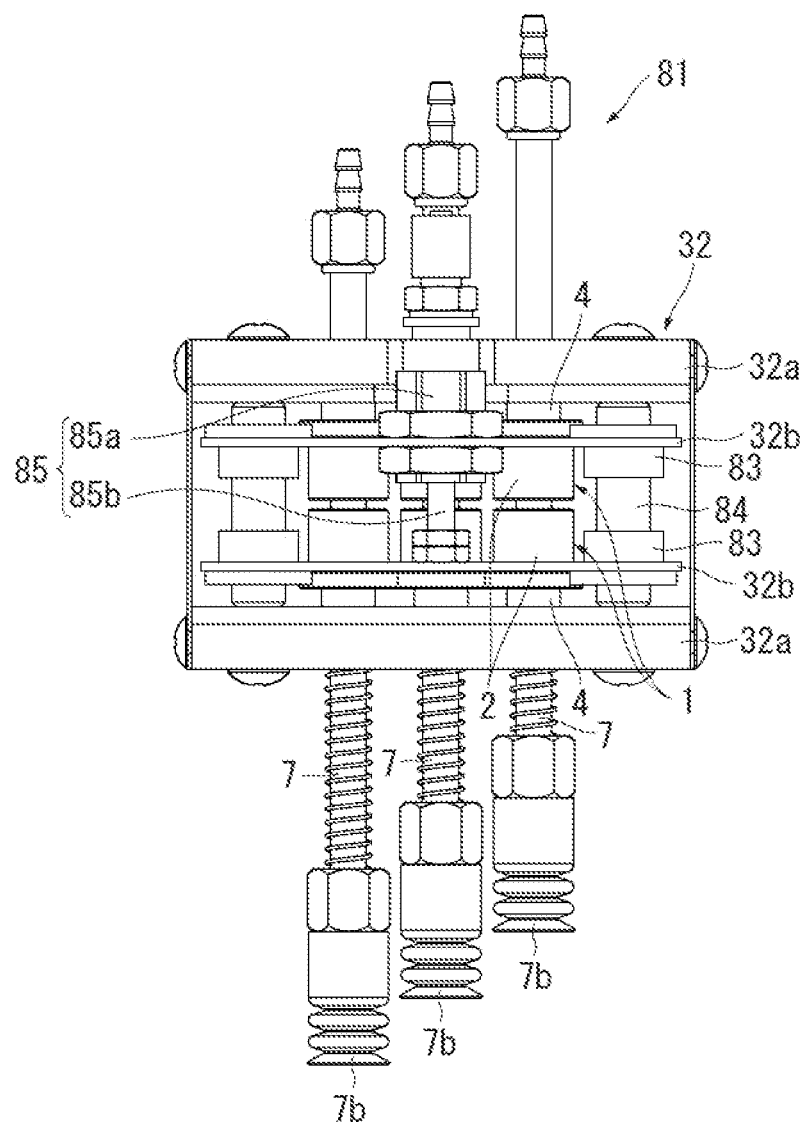
FIG. 17 is a side view of the workpiece holding apparatus of the sixth embodiment of the present invention (the clamping state).

The space between the two movable plates 32b is adjusted by a cylinder device 85 such as an air cylinder. A main body 85a of the cylinder device 85 is attached to the upper movable plate 32b. A rod 85b of the cylinder device 85 is attached to the lower movable plate 32b. As illustrated in FIG. 16(a), if the cylinder device 85 increases the space between the two movable plates 32b, the clamping devices 1 enter the unclamping state. As illustrated in FIG. 17, if the cylinder device 85 reduces the space between the two movable plates 32b, the clamping devices 1 enter the clamping state.

As illustrated in FIG. 16(b), as viewed in the axial direction of the main body 32, the plurality of shaft members 7 includes first shaft members 7-1 placed at the vertices of a first regular hexagon h1, and second shaft members 7-2 placed at the vertices of a second regular hexagon h2 having longer sides than the first regular hexagon h1, the second regular hexagon h2 being substantially displaced 30° from the first regular hexagon h1. The cylinder device 85 (refer to FIG. 16(a)) is placed inside the first regular hexagon h1. For example, four shafts 84 that guide the movable plates 32b are placed outside the second regular hexagon h2. The shafts 84 are each placed equidistant from a respective pair of adjacent second shaft members 7-2. Linear motion bearings 83 such as bushings into which respective shafts 84 are inserted are attached to each of the movable plates 32b.

The first shaft members 7-1 and the second shaft members 7-2 may be placed at the vertices of regular n-gons (n≥4), and the second regular n-gon h2 may be displaced 180°/n from the first regular n-gon h1.

The operation of the workpiece holding apparatus 81 of the sixth embodiment is described. When the main body 32 is brought closer to an unillustrated workpiece in the unclamping state illustrated in FIG. 16(a), the suction pads 7b of the shaft members 7 come into contact with the workpiece and follow the shape of the workpiece as illustrated in FIG. 17. The cylinder device 85 is operated to switch the clamping devices 1 from the unclamping state to the clamping state. A vacuum is created in each of the suction pads 7b, and thus it is possible to suction the workpiece.

The workpiece holding apparatus 81 of the sixth embodiment has the following effects:

As viewed in the axial direction of the main body 32, the plurality of shaft members 7 includes the first shaft members 7-1 placed at the vertices of the first regular n-gon h1, and the second shaft members 7-2 placed at the vertices of the second regular n-gon h2. Therefore, two adjacent inner first shaft members 7-1 and one outer second shaft member 7-2 can form a triangle, and the plurality of shaft members 7 can be placed in a densely packed manner.

The cylinder device 85 is placed inside the first regular n-gon h1 as viewed in the axial direction of the main body 32. As a result, it is possible to make effective use of space and make the main body 32 compact.

The shafts 84 that guide the movable plates 32b are placed outside the second regular n-gon h2 as viewed in the axial direction of the main body 32. As a result, it is possible to make effective use of space and make the main body 32 compact.

The description is based on Japanese Patent Application No. 2020-089319 filed on May 22, 2020 and Japanese Patent Application No. 2020-150244 filed on Sep. 8, 2020, the entire contents of which are incorporated herein.

REFERENCE SIGNS LIST

1 Clamping device
7 Shaft member
7a Contactor (part of shaft member)
7b Suction pad (suction member)
7-1 First shaft member
7-2 Second shaft member
11, 21, 31, 41, 71, 81 Workpiece holding apparatus
12, 22, 32, 42 Main body
15, 54 Lever
16, 51 Trigger member
23, 43a Return member
24, 72 Spring
32b, 42c Movable plate
44 Motor
51a Plate portion
51b Shaft portion (part of trigger member)
53, 84 Shaft to guide movable plate
56 Shaft to guide trigger member
61 Motor control device
85 Cylinder device
W Workpiece
h1 First regular hexagon
h2 Second regular hexagon

The invention claimed is:

1. A workpiece holding apparatus comprising:
a main body;
at least one shaft member capable of coming into contact with a workpiece;
a clamping device into which the shaft member is inserted, the clamping device being attached to the main body and capable of switching between an unclamping state that releases the shaft member and a clamping state that clamps the shaft member; and
a trigger member configured to switch the clamping device between the unclamping state and the clamping state, wherein
the main body includes a pair of the main bodies placed in such a manner as to sandwich the workpiece,
each of the pair of the main bodies includes a stationary plate and a movable plate, and
the trigger member comes into direct contact with the workpiece, or comes into indirect contact with the workpiece via at least a part of the shaft member, thus moving relative to the main body, the movable plate moving relative to the stationary plate, and the clamping device switches from the unclamping state to the clamping state.

2. A workpiece holding apparatus comprising:
a main body;
at least one shaft member capable of coming into contact with a workpiece;
a clamping device into which the shaft member is inserted, the clamping device being attached to the main body and capable of switching between an unclamping state that releases the shaft member and a clamping state that clamps the shaft member; and
a trigger member configured to switch the clamping device between the unclamping state and the clamping state, wherein
the trigger member comes into direct contact with the workpiece, or comes into indirect contact with the workpiece via at least a part of the shaft member, thus moving relative to the main body, and the clamping device switches from the unclamping state to the clamping state, and
the trigger member includes a plate portion through which the at least one shaft member is inserted and with which a contactor at a distal end of the shaft member is capable of coming into contact.

3. The workpiece holding apparatus according to claim 1, wherein the trigger member is tiltably coupled to a lever for switching the clamping device between the unclamping state and the clamping state.

4. The workpiece holding apparatus according to claim 1, wherein the contact of the trigger member with a return member, or a spring, moves the trigger member relative to the main body to switch the clamping device from the clamping state to the unclamping state.

5. A workpiece holding apparatus comprising:
a main body;
a plurality of shaft members capable of coming into contact with a workpiece; and
a plurality of clamping devices into which the plurality of shaft members is inserted, the plurality of clamping devices being attached to the main body and capable of switching between an unclamping state that releases the shaft members and a clamping state that clamps the shaft members, wherein
as viewed in an axial direction of the main body, the plurality of shaft members includes first shaft members placed at the vertices of a first regular n-gon, and second shaft members placed at the vertices of a second regular n-gon having longer sides than the first regular n-gon, the second regular n-gon having a center substantially the same as that of the first n-gon, the second regular n-gon being rotationally displaced, substantially 180°/relative to the first regular n-gon,
where n is any of integers equal to or greater than four.

6. The workpiece holding apparatus according to claim 5, wherein as viewed in the axial direction of the main body, at least a part of a trigger member or a cylinder device for switching the clamping devices between the unclamping state and the clamping state is placed inside the first regular n-gon.

7. The workpiece holding apparatus according to claim 5, wherein as viewed in the axial direction of the main body, a shaft for guiding the trigger member, and/or a shaft for guiding a movable plate, to switch the clamping devices between the unclamping state and the clamping state is/are placed outside the second regular n-gon.

8. The workpiece holding apparatus according to claim 1, wherein
a pair of the main bodies is placed in such a manner as to sandwich the workpiece, and
the workpiece holding apparatus comprises: a motor configured to move the main bodies to and from the workpiece; and a motor control device configured to stop the motor upon a current value of the motor being equal to or greater than a threshold of the current value.

9. A workpiece holding apparatus comprising:
a main body;
at least one shaft member capable of coming into contact with a workpiece;
a clamping device into which the shaft member is inserted, the clamping device being attached to the main body and capable of switching between an unclamping state that releases the shaft member and a clamping state that clamps the shaft member; and
a trigger member configured to switch the clamping device between the unclamping state and the clamping state, wherein
the trigger member comes into direct contact with the workpiece, or comes into indirect contact with the workpiece via at least a part of the shaft member, thus moving relative to the main body, and the clamping device switches from the unclamping state to the clamping state, and
the shaft members are formed hollow, and each include, at a distal end thereof, a suction member that suctions the workpiece.

10. The workpiece holding apparatus according to claim 2, wherein the trigger member is tiltably coupled to a lever for switching the clamping device between the unclamping state and the clamping state.

11. The workpiece holding apparatus according to claim 2, wherein the contact of the trigger member with a return member, or a spring, moves the trigger member relative to the main body to switch the clamping device from the clamping state to the unclamping state.

12. The workpiece holding apparatus according to claim 3, wherein the contact of the trigger member with a return member, or a spring, moves the trigger member relative to the main body to switch the clamping device from the clamping state to the unclamping state.

13. The workpiece holding apparatus according to claim 6, wherein as viewed in the axial direction of the main body, a shaft for guiding the trigger member, and/or a shaft for guiding a movable plate, to switch the clamping devices between the unclamping state and the clamping state is/are placed outside the second regular n-gon.

14. The workpiece holding apparatus according to claim 2, wherein
a pair of the main bodies is placed in such a manner as to sandwich the workpiece, and
the workpiece holding apparatus comprises: a motor configured to move the main bodies to and from the workpiece; and a motor control device configured to stop the motor upon a current value of the motor being equal to or greater than a threshold of the current value.

15. The workpiece holding apparatus according to claim 3, wherein
a pair of the main bodies is placed in such a manner as to sandwich the workpiece, and
the workpiece holding apparatus comprises: a motor configured to move the main bodies to and from the workpiece; and a motor control device configured to stop the motor upon a current value of the motor being equal to or greater than a threshold of the current value.

16. The workpiece holding apparatus according to claim 4, wherein
a pair of the main bodies is placed in such a manner as to sandwich the workpiece, and
the workpiece holding apparatus comprises: a motor configured to move the main bodies to and from the workpiece; and a motor control device configured to stop the motor upon a current value of the motor being equal to or greater than a threshold of the current value.

17. The workpiece holding apparatus according to claim 5, wherein
a pair of the main bodies is placed in such a manner as to sandwich the workpiece, and
the workpiece holding apparatus comprises: a motor configured to move the main bodies to and from the workpiece; and a motor control device configured to stop the motor upon a current value of the motor being equal to or greater than a threshold of the current value.

18. The workpiece holding apparatus according to claim 6, wherein
a pair of the main bodies is placed in such a manner as to sandwich the workpiece, and
the workpiece holding apparatus comprises: a motor configured to move the main bodies to and from the workpiece; and a motor control device configured to stop the motor upon a current value of the motor being equal to or greater than a threshold of the current value.

19. The workpiece holding apparatus according to claim 7, wherein
a pair of the main bodies is placed in such a manner as to sandwich the workpiece, and
the workpiece holding apparatus comprises: a motor configured to move the main bodies to and from the workpiece; and a motor control device configured to stop the motor upon a current value of the motor being equal to or greater than a threshold of the current value.

20. The workpiece holding apparatus according to claim 2, wherein the shaft members are formed hollow, and each include, at a distal end thereof, a suction member that suctions the workpiece.

* * * * *